(12) United States Patent
Bhattad et al.

(10) Patent No.: US 9,407,409 B2
(45) Date of Patent: Aug. 2, 2016

(54) CHANNEL STATE INFORMATION REFERENCE SIGNALS

(75) Inventors: Kapil Bhattad, San Diego, CA (US); Peter Gaal, San Diego, CA (US); Tao Luo, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 13/032,592

(22) Filed: Feb. 22, 2011

(65) Prior Publication Data

US 2012/0058791 A1 Mar. 8, 2012

Related U.S. Application Data

(60) Provisional application No. 61/307,413, filed on Feb. 23, 2010, provisional application No. 61/307,758, filed on Feb. 24, 2010, provisional application No. 61/374,556, filed on Aug. 17, 2010, provisional application No. 61/438,183, filed on Jan. 31, 2011.

(51) Int. Cl.
*H04B 7/216* (2006.01)
*H04L 5/00* (2006.01)
(Continued)

(52) U.S. Cl.
CPC ............ *H04L 5/0048* (2013.01); *H04L 1/0606* (2013.01); *H04L 1/0618* (2013.01);
(Continued)

(58) Field of Classification Search
CPC ........ H04W 72/04; H04B 5/00; H04L 1/0606

USPC ......... 370/210, 252, 280, 329, 335; 375/146, 375/260; 455/509
See application file for complete search history.

(56) References Cited

U.S. PATENT DOCUMENTS

| | | | |
|---|---|---|---|
| 7,573,854 | B2 | 8/2009 | Heo et al. |
| 8,000,284 | B2 | 8/2011 | Lott et al. |

(Continued)

FOREIGN PATENT DOCUMENTS

| | | |
|---|---|---|
| CN | 101588631 A | 11/2009 |
| CN | 101636938 A | 1/2010 |

(Continued)

OTHER PUBLICATIONS

"3rd Generation Partnership Project; Technical Specification Group Radio Access Network; Evolved Universal Terrestrial Radio Access (E-UTRA); Physical Channels and Modulation" (Release 8), 3GPP TS 36.211 V8.9.0 (Dec. 2009).

(Continued)

*Primary Examiner* — Gregory Sefcheck
*Assistant Examiner* — Jael Ulysse
(74) *Attorney, Agent, or Firm* — Liem T. Do

(57) ABSTRACT

In a wireless communication system, from available data resource elements (REs) in a subframe, REs are assigned to transmissions of a reference signal, thereby resulting in a plurality of remaining data REs. Furthermore, REs from the plurality of remaining data REs are assigned for data transmission to a wireless device in groups of a predetermined number of REs such that all assigned data REs within a group are within a predetermined number of symbols of each other in time domain and within a second predetermined number of subcarriers of each other in frequency domain, thereby resulting in at least one ungrouped RE.

42 Claims, 30 Drawing Sheets

(51) Int. Cl.
*H04L 1/06* (2006.01)
*H04L 27/26* (2006.01)

(52) U.S. Cl.
CPC ............ *H04L 5/001* (2013.01); *H04L 5/0007* (2013.01); *H04L 5/0016* (2013.01); *H04L 5/0023* (2013.01); *H04L 5/0035* (2013.01); *H04L 5/0051* (2013.01); *H04L 5/0053* (2013.01); *H04L 5/0073* (2013.01); *H04L 27/261* (2013.01); *H04L 1/0668* (2013.01)

(56) References Cited

U.S. PATENT DOCUMENTS

| | | | |
|---|---|---|---|
| 8,254,429 | B1 | 8/2012 | Xu et al. |
| 8,310,994 | B2 | 11/2012 | Kwon et al. |
| 8,559,879 | B2 | 10/2013 | Bhushan et al. |
| 8,913,581 | B2 | 12/2014 | Noh et al. |
| 2006/0153312 | A1 | 7/2006 | Yun et al. |
| 2008/0267158 | A1* | 10/2008 | Zhang .............. H04B 7/0671 370/342 |
| 2009/0202014 | A1 | 8/2009 | Mujtaba et al. |
| 2009/0225721 | A1* | 9/2009 | Cudak ............... H04L 5/0007 370/330 |
| 2009/0296563 | A1* | 12/2009 | Kishiyama ........... H04J 13/00 370/210 |
| 2010/0034299 | A1 | 2/2010 | Love |
| 2010/0034310 | A1* | 2/2010 | Nam ................ H04L 1/0606 375/267 |
| 2010/0080187 | A1* | 4/2010 | Papasakellariou .... H04L 5/0051 370/329 |
| 2010/0238821 | A1 | 9/2010 | Liu et al. |
| 2010/0246697 | A1* | 9/2010 | Teng ................ H04L 1/0687 375/260 |
| 2010/0265901 | A1* | 10/2010 | Koo ............... H04L 25/0242 370/329 |
| 2010/0322325 | A1 | 12/2010 | Joko |
| 2011/0194551 | A1* | 8/2011 | Lee ............... H04B 7/0626 370/342 |
| 2011/0200126 | A1* | 8/2011 | Bontu .............. H04L 25/0232 375/260 |
| 2011/0237270 | A1 | 9/2011 | Noh et al. |
| 2011/0244877 | A1 | 10/2011 | Farajidana et al. |
| 2011/0252139 | A1 | 10/2011 | Bhattad |
| 2011/0274071 | A1 | 11/2011 | Lee, II et al. |
| 2011/0317641 | A1* | 12/2011 | Noh ................ H04L 1/0027 370/329 |
| 2012/0002740 | A1* | 1/2012 | Han ................ H04L 5/0048 375/260 |
| 2012/0076106 | A1 | 3/2012 | Bhattad et al. |
| 2012/0082119 | A1* | 4/2012 | Chung .............. H04B 7/06 370/329 |
| 2012/0092989 | A1 | 4/2012 | Baldemair et al. |
| 2012/0106493 | A1* | 5/2012 | Noh ................ H04L 5/0048 370/329 |
| 2012/0120842 | A1* | 5/2012 | Kim ................ H04B 7/024 370/252 |
| 2012/0120903 | A1* | 5/2012 | Kim ................ H04B 7/024 370/329 |
| 2012/0120905 | A1* | 5/2012 | Ko ................. H04B 7/0413 370/329 |
| 2012/0127945 | A1* | 5/2012 | Ko ................. H04B 7/0413 370/329 |
| 2012/0155414 | A1 | 6/2012 | Noh et al. |
| 2012/0220327 | A1* | 8/2012 | Lee, II .............. H04W 72/1273 455/509 |
| 2012/0257553 | A1* | 10/2012 | Noh ................ H04J 11/0053 370/280 |
| 2013/0039203 | A1* | 2/2013 | Fong ............... H04B 7/024 370/252 |
| 2013/0039388 | A1* | 2/2013 | Xu ................. H04L 1/0073 375/146 |

FOREIGN PATENT DOCUMENTS

| | | |
|---|---|---|
| JP | 2008520167 A | 6/2008 |
| JP | 2009194847 A | 8/2009 |
| JP | 2011515047 A | 5/2011 |
| JP | 2013519287 A | 5/2013 |
| KR | 20070089107 A | 8/2007 |
| WO | 2005018181 | 2/2005 |
| WO | WO-2006055241 A2 | 5/2006 |
| WO | 2006118434 A1 | 11/2006 |
| WO | 2007083081 A1 | 7/2007 |
| WO | 2008115003 A2 | 9/2008 |
| WO | WO-2009114376 A1 | 9/2009 |
| WO | WO-2009132143 A1 | 10/2009 |
| WO | WO-2011037427 A2 | 3/2011 |
| WO | WO-2011083761 A1 | 7/2011 |
| WO | WO-2011096646 A2 | 8/2011 |
| WO | WO-2011100672 A1 | 8/2011 |

OTHER PUBLICATIONS

"Way forward on CoMP and MIMO DL RS—Outcome of ad hoc discussions" Tdoc R1-090529, 3GPP TSG-RAN-WG1 #55bis, Jan. 12-16, 2009, Ljubljana, Slovenia.

Qualcomm Europe, "Further Considerations and Link Simulations on Reference Signals in LTE-A", 3GPP TSG-RAN WG1 #56, R1-090875, Feb. 9-13, 2009, Athens, Greece.

Qualcomm Europe, "Downlink RS structure in support of higher-order MIMO", 3GPP TSG-RAN WG1 #57, R1-092050, May 4-8, 2009, San Francisco, USA.

Nokia, Nokia Siemens Networks, "On the impact of CSI-RS puncturing to Rel'8 PDSCH performance", 3GPP TSG RAN WG1 Meeting #57bis, R1-092557, Los Angeles, USA, Jun. 29-Jul. 3, 2009.

Samsung, "Discussions on CSI-RS for LTE-Advanced", 3GPP TSG RAN WG1 #57bis, R1-092651, Los Angeles, USA, Jun. 29-Jul. 3, 2009.

Alcatel-Lucent, et al. "Proposed Way forward on Rel-9 Dual-layer beamforming for TDD and FDD", 3GPP TSG RAN WG1 meeting #58, R1-093697, CHN, Shenzhen, Aug. 24-28, 2009.

Qualcomm Europe, "UE-RS Patterns for Rank 3-4", 3GPP TSG-RAN WG1 #58bis R1-094211, Oct. 12-16, 2009, Miyazaki, Japan.

Qualcomm Europe, "UE-RS Patterns for ranks 5 to 8 of LTE-A" 3GPP TSG-RAN WG1 #58bis R1-094212, Oct. 12-16, 2009 Miyazaki, Japan.

LG Electronics, et al., "Harmonized Proposal for CSI-RS Pattern", 3GPP TSG RAN WG1 Meeting #61b, R1-104263, Dresden, Germany, Jun. 28-Jul. 2, 2010.

Huawei, "Evaluation on muting benefit for CSI RS design", 3GPP TSG-RAN WG1 #61, R1-103102, Montreal, Canada, May 10-14, 2010.

NTT DOCOMO, "Performance Evaluation of RE Muting for Inter-cell CSI-RS" 3GPP TSG RAN WG1 Meeting #61, R1-103254, Montreal, Canada, May 10-14, 2010.

Qualcomm Inc., "Benefits of Muting for Enhanced CSI Estimation" 3GPP TSG-RAN WG1 #60bis, R1-102332, Apr. 12-16, 2010, Beijing, China.

Texas Instruments, "PDSCH Muting for Inter-cell CSI estimation: Rel-8 UE Performance", 3GPP TSG RAN WG1 #61, R1-102819, Montreal, Canada, May 10-14, 2010.

Panasonic, "Link level analysis on RE muting for CSI-RS design: Step1 evaluation", 3GPP TSG RAN WG1 Meeting #61, R1-102871, Montreal, Canada, May 10-14, 2010.

Zte, "CSI-RS Muting Evaluation", 3GPP TSG RAN WG1 Meeting #61, R1-102900, Montreal, Canada, May 10-14, 2010.

Nokia, Nokia Siemens Networks, "Stage 1 simulation study of RE muting for inter-cell CSI-RS", 3GPP TSG-RAN WG1 Meeting #61, R1-102957, Montreal, Canada, May 10-14, 2010.

Alcatel-Lucent Shanghai Bell et al: CSI-RS Inter-cell Design Consideration, 3GPP Draft; R1-100924_Final, 3rd Generation Partnership Project (3GPP), Mobile Competence Centre ; 650, Route Des Lucioles ; F-06921 Sophia-Antipolis Cedex ; France, vol. RAN WGI, No. San Francisco, USA; 20100222, Feb. 16, 2010, XP050418523, [retrieved on Feb. 16, 2010].

(56) References Cited

OTHER PUBLICATIONS

Catt: "Intra cell and inter cell CSI RS design for LTE-A", 3GPP Draft; R1-100885, 3rd Generation Partnership Project (3GPP), Mobile Competence Centre ; 650, Route Des Lucioles ; F-06921 Sophia-Antipolis Cedex 71, ; France, vol. RAN WGI, No. San Francisco, USA; 20100222, Feb. 16, 2010, 92-107, XP050418489, [retrieved on Feb. 16, 2010].
Fujitsu: "Considerations on CSI RS design in LTE-A", 3GPP Draft, R1-094331, 3rd Generation Partnership Project (3GPP), Mobile Competence Centre, 650, Route Des Lucioles, F-06921 Sophia-Antipolis Cedex, France, No. Miyazaki, 20091012, Oct. 12, 2009, XP050388785, [retrieved on Oct. 15, 2009].
Huawei: "Inter-cell CSI-RS Analysis", 3GPP Draft, R1-100248 Inter-Cell CSI RS, 3rd Generation Partnership Project (3GPP), Mobile Competence Centre, 650, Route Des Lucioles, F-06921 Sophia-Antipolis Cedex, France, vol. RAN WGI, No. Valencia, Spain, 20100118, Jan. 14, 2009, XP050418351, [retrieved on Jan. 14, 2010].
Huawei: "Intra-cell CSI RS design and evaluation", 3GPP Draft; R1-100782, 3rd Generation Partnership Project (3GPP), Mobile Competence Centre ; 650, Route Des Lucioles ; F-06921 Sophia-Antipolis Cedex ; France, vol. RAN WGI, No. Valencia, Spain; 20100118, Jan. 21, 2010, XP050418401, [retrieved on Jan. 21, 2010].
Intel Corporation (UK) Ltd: "Signalling and power utilization considerations for PDSCH muting", 3GPP Draft; R1-104376, 3rd Generation Partnership Project (3GPP), Mobile Competence Centre ; 650, Route Des Lucioles ; F-06921 Sophia-Antipolis Cedex ; France, vol. RAN WGI, No. Madrid, Spain; 20100823, Aug. 17, 2010, XP050449727, [retrieved on Aug. 17, 2010].
Intel Corporation (UK): "Remaining details of CSI-RS structure", 3GPP Draft; R1-110249, 3rd Generation Partnership Project (3GPP), Mobile Competence Centre ; 650, Route Des Lucioles ; F-06921 Sophia-Antipolis Cedex ; France, vol. RAN WGI, No. Dublin, Ireland; 20110117, Jan. 11, 2011, XP050490153, [retrieved on Jan. 11, 2011].
International Search Report and Written Opinion—PCT/US2011/025961—ISA/EPO—Jan. 31, 2012.
Motorola: "Impact of Supporting Blank Sub frames", 3GPP TSG RAN Plenary Meeting No. 42, Athens, Greece, [Online] vol. RP-081059, Dec. 2, 2008, pp. 1-10, XP002589696, Retrieved from the Internet: URL:http://www.3gpp.org/ftp/tsg-ran/tsg-ran/TSGR42/docs/> [retrieved on Jun. 28, 2010] the whole document.
Nokia et al., "CSI-RS design for LTE-Advanced downlink", 3GPP Draft, R1-091351, 3rd Generation Partnership Project (3GPP), Mobile Competence Centre, 650, Route Des Lucioles, F-06921 Sophia-Antipolis Cedex, France, No. Seoul, Korea, 20090318, Mar. 18, 2009, XP050338944, [retrieved on Mar. 18, 2009].
Nokia, et al., "Further considerations on UE-specific reference symbol multiplexing for LTE-Advanced downlink", 3GPP Draft, R1-091757, 3rd Generation Partnership Project (3GPP), Mobile Competence Centre, 650, Route Des Lucioles, F-06921 Sophia-Antipolis Cedex, France, No. San Francisco, USA, 20090428, Apr. 28, 2009, XP050339282, [retrieved on Apr. 28, 2009].
Nokia et al: "Transmit Diversity in CSI-RS Subframes", 3GPP Draft; R1-106202, 3rd Generation Partnership Project (3GPP), Mobile Competence Centre ; 650, Route Des Lucioles ; F-06921 Sophia-Antipolis Cedex ; France, vol. RAN WGI, No. Jacksonville, USA; 20101115, Nov. 9, 2010, XP050466933, [retrieved on Nov. 9, 2010].
NTT DOCOMO: "CSI-RS Design for LTE-Advanced", 3GPP Draft; R1-101214 CSI-RS Design, 3rd Generation Partnership Project (3GPP), Mobile Competence Centre ; 650, Route Des Lucioles ; F-06921 Sophia-Antipolis Cedex ; France, vol. RAN WGI, No. San Francisco, USA; 20100222, Feb. 16, 2010, XP050418731, [retrieved on Feb. 16, 2010].
Panasonic: "Downlink CSI-RS design for inter-cell scenarios", 3GPP Draft, R1-093457, 3rd Generation Partnership Project (3GPP), Mobile Competence Centre, 650, Route Des Lucioles, F-06921 Sophia-Antipolis Cedex, France, No. Shenzhen, China, 20090818, Aug. 18, 2009, XP050351727, [retrieved on Aug. 18, 2009].

Qualcomm Inc: "SFBC PDSCH transmission in CSI-RS subframes", 3GPP Draft; R1-104798 SFBC Mapping, 3rd Generation Partnership Project (3GPP), Mobile Competence Centre ; 650, Route Des Lucioles ; F-06921 Sophia-Antipolis Cedex ; France, vol. RAN WGI, No. Madrid, Spain; 20100823, Aug. 17, 2010, XP050449990, [retrieved on Aug. 17, 2010].
Qualcomm Incorporated: "Finalizing Signaling and Configuration of CSI-RS", 3GPP Draft; R1-105565 Finalizing Signaling and Configuration of CSI-RS, 3rd Generation Partnership Project (3GPP), Mobile Competence Centre ; 650, Route Des Lucioles ; F-06921 Sophia-Antipolis Cedex ; France, vol. RAN WGI, No. Xian; 20101011, Oct. 5, 2010, XP050450663, [retrieved on Oct. 5, 2010].
Samsung, "Discussions on CSI-RS for LTE-Advanced", 3GPP Draft, R1-093375 CSI RS Designs in LTE-A, 3rd Generation Partnership Project (3GPP), Mobile Competence Centre , 650, Route Des Lucioles , F-06921 Sophia-Antipolis Cedex , France, No. Shenzhen, China, 20090819, Aug. 19, 2009, XP050351673.
Samsung: "Necessity of Orthogonal Inter-cell CSI-RS Patterns", 3GPP Draft; R1-101156 Orthogonal CSI-RS Pattern, 3rd Generation Partnership Project (3GPP), Mobile Competence Centre ; 650, Route Des Lucioles ; F-06921 Sophia-Antipolis Cedex ; France, vol. RAN WGI, No. San Francisco, USA; 20100222, Feb. 16, 2010, XP050418696, [retrieved on Feb. 16, 2010].
Samsung, "Performance evaluation for CSI-RS design", 3GPP TSG RAN WG1 #59bis, R1-100106, Valencia, Spain, Jan. 18-22, 2009.
Texas Instruments: "Multiplexing and Signaling Support for Downlink COMP", 3GPP Draft, R1-091292 TI DL Comp, 3rd Generation Partnership Project (3GPP), Mobile Competence Centre, 650, Route Des Lucioles, F-06921 Sophia-Antipolis Cedex, France, No. Seoul, Korea, 20090318, Mar. 18, 2009, XP050338899, [retrieved on Mar. 18, 2009].
Zte, "Resource Mapping Issues on JP transmission in CoMP", 3GPP Draft, R1-090070 Resource Mapping Issues on JP Transmission in Comp, 3rd Generation Partnership Project (3GPP), Mobile Competence Centre , 650, Route Des Lucioles , F-06921 Sophia-Antipolis Cedex , France, No. Ljubljana, 20090107, Jan. 7, 2009, XP050318014.
Huawei: "Cell-specific mapping of distributed virtual resource blocks", 3GPP TSG-RAN WG1 Meeting #50, R1-073513, Aug. 20, 2007, pp. 1-8.
Huawei: "Further results of transmit diversity schemes for common", distributed and broadcast channels, 3GPP TSG-RAN WG1 Meeting #44, R1-060494, Feb. 13, 2006, pp. 1-6.
Alcatel-Lucent Shanghai Bell: "Considerations on CSI-RS design", 3GPP TSG-RAN WG1#58b R1-093772, Oct. 6, 2009.
Fujitsu: "Considerations on CSI RS design in LTE-A", 3GPP TSG-RAN WG1#58b R1-094249, Oct. 8, 2009.
Fujitsu: "CSI-RS and DRS Design for LTE-A System", 3GPP Draft; R1-091950, 3rd Generation Partnership Project (3GPP), Mobile Competence Centre; 650, USA; 20090502, May 2, 2009, XP050339424, [retrieved on May 2, 2009] p. 1-p. 2 figures 1, 3, 5-8.
NTT DOCOMO: "DL CSI-RS Design for LTE-Advanced", 3GPP TSG-RAN WG1#58b R1-094240, Oct. 6, 2009.
Panasonic: "Views on CSI-RS and Rel-8 CRS configuration", 3GPP TSG-RAN WG1#58 R1-093455, Aug. 18, 2009.
Samsung: "Discussions on CSI-RS for LTE-Advanced", 3GPP TSG-RAN WG1#57 R1-092204, May 5, 2009.
ZTE: "DL Reference Signal Design for CSI generation in LTE-Advanced", 3GPP TSG-RAN WG1#57 R1-091714, Apr. 28, 2009.
Baker M., "LTE-Advanced Physical Layer", IMT-Advanced Evaluation Workshop Dec. 17-18, 2009, Beijing, 9 No. REV-090003r1 Dec. 17, 2009, pp. 1-48, XP002637658, Retrieved from the Internet: URL:http://www.3gpp.org/ftp/workshop/2009-12-17_ITU-R_IMT-Adv_eval/docs/pdf/REV-090003-r1.pdf [retrieved on May 18, 2011] p. 17-p. 19.
Huawei Technologies., "CSI-RS simulation assumptions", 3GPP TSG RAN WG1 meeting #60, R1-101632, Feb. 22-26, 2010, San Francisco, USA, 7 pages.

(56) References Cited

OTHER PUBLICATIONS

Qualcomm Inc., "Further Details on CSI-RS", 3GPP TSG-RAN WG1 #60, R1-101485, 7.21, Feb. 22-26, 2010, San Francisco, USA, 4 Pages.

LG Electronics, "Inter-Cell CSI-RS design and Inter-Cell measurement consideration", 3GPP TSG-RAN WG1 Meeting #60 R1-101550, Feb. 19, 2010, <http://www.3gpp.org/ftp/tsg_ran/wg1_rl1/TSGR1_60/Docs/>.

Qualcomm Inc, "Further details on CSI-RS. [online]", 3GPP TSG-RAN WG1 #59 bis R1-100681, Jan. 12, 2010, <http://www.3gpp.org/ftp/tsg_ran/wg1_rl1/TSGR1_59b/Docs/>.

ZTE Corporation, "CSI-RS Pattern Design for LTE-Advanced", 3GPP TSG-RAN WG1 Meeting #60 R1-100969, Feb. 18, 2010, <http://www.3gpp.org/ftp/tsg_ran/wg1_rl1/TSGR1_60/Docs/>.

Taiwan Search Report—TW100106078—TIPO—Dec. 25, 2014.

European Search Report—EP16155204—Search Authority—Munich—Jun. 13, 2016.

\* cited by examiner

Each alphabet shows one SFBC-FSTD pair with numbers indicating the antenna ports used

| A 0,2 | B 0,2 |
| A 0,2 | B 0,2 |
| A 1,3 | B 1,3 |
| A 1,3 | B 1,3 |
| CSIRS1 | CSIRS3 |
| C 0,2 | D 0,2 |
| C 0,2 | D 0,2 |
| CSIRS2 | CSIRS4 |
| C 1,3 | D 1,3 |
| C 1,3 | D 1,3 |
| E 0,2 | E 0,2 |
| E 1,3 | E 1,3 |

STBC for unpaired tone Power balanced

| A 0,2 | B 0,2 |
| A 0,2 | B 0,2 |
| A 1,3 | B 1,3 |
| A 1,3 | B 1,3 |
| CSIRS 1 | CSIRS 3 |
| C 0,2 | D 0,2 |
| C 0,2 | D 0,2 |
| CSIRS 2 | CSIRS 4 |
| C 1,3 | D 1,3 |
| C 1,3 | D 1,3 |
| E 0,2 | F 0,2 |
| E 0,2 | F 0,2 |

Unpaired Power imbalance

FIG. 5

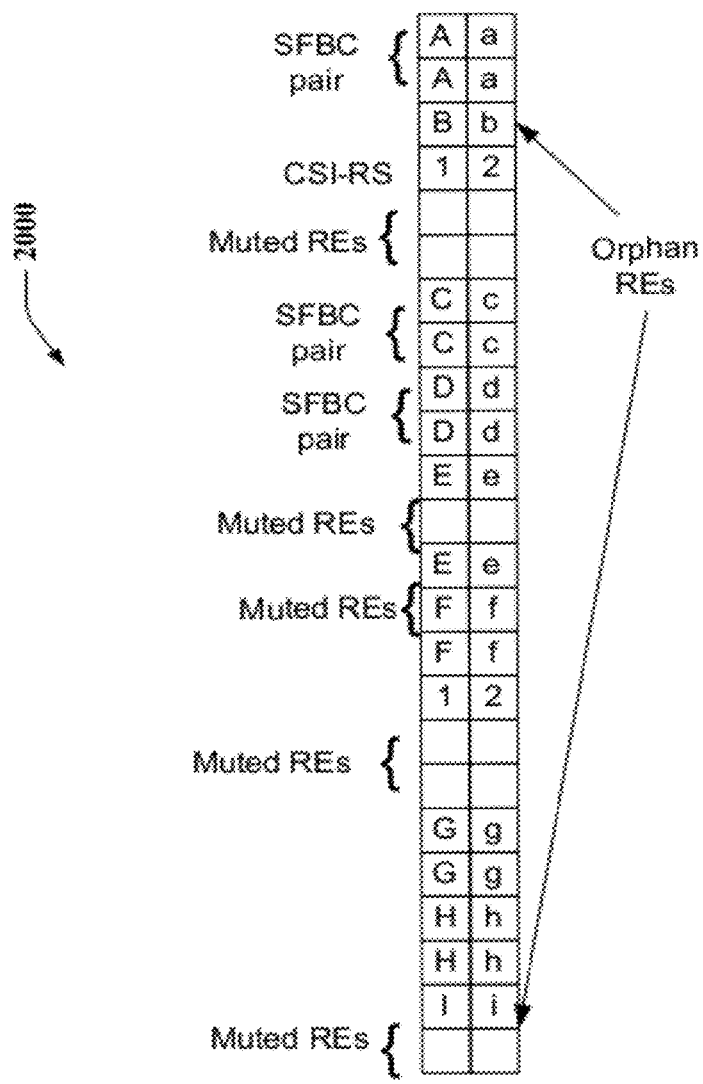

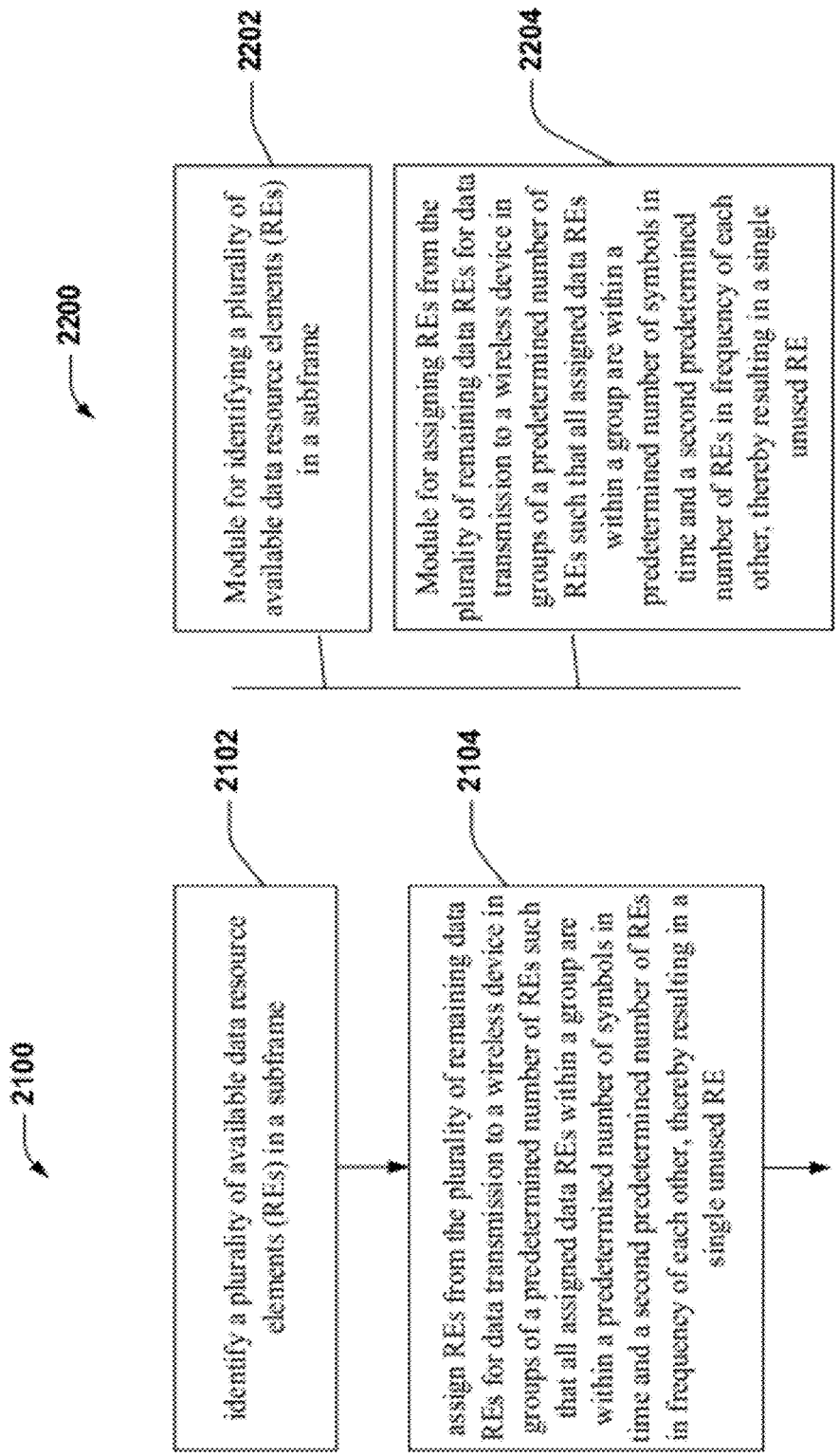

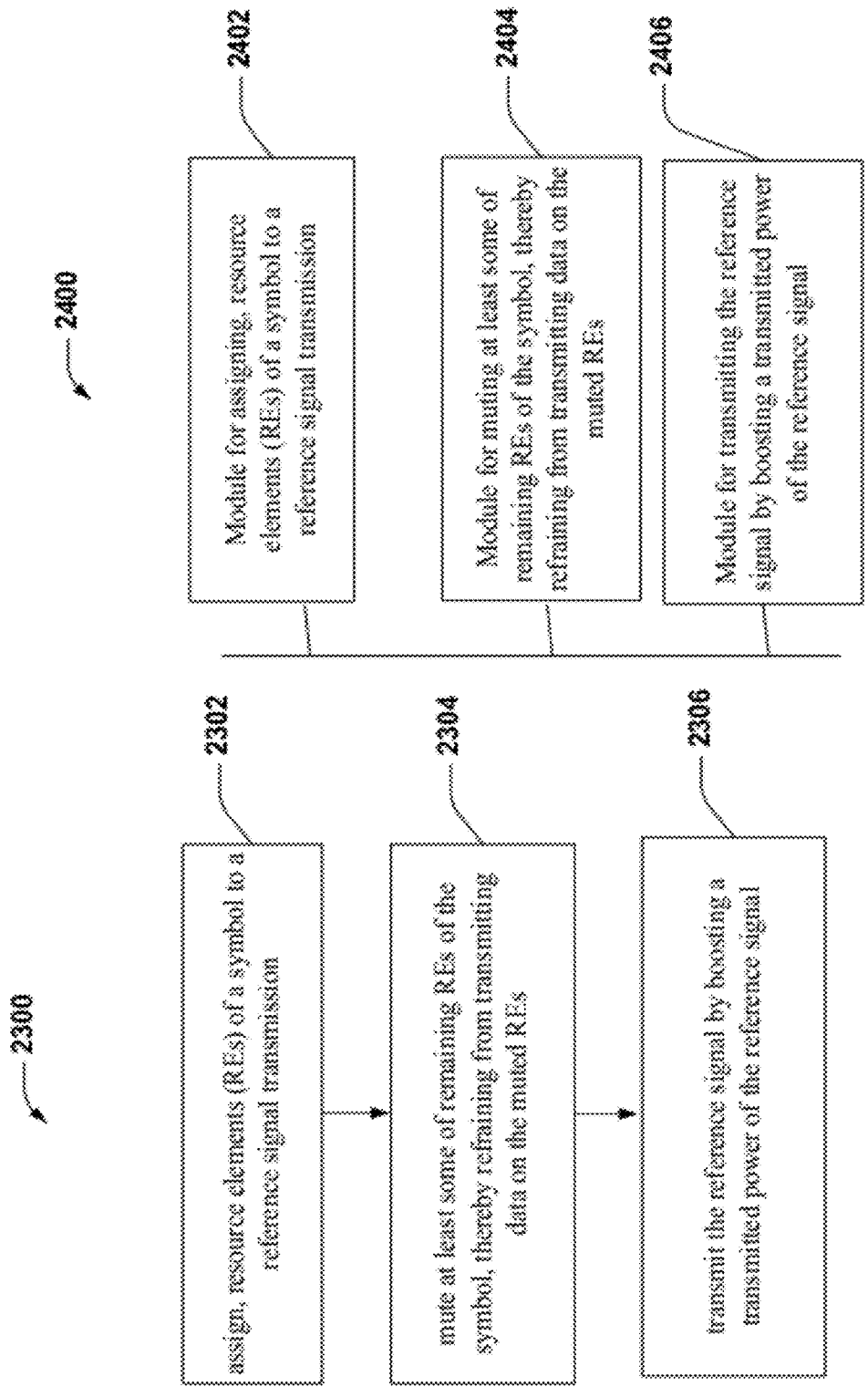

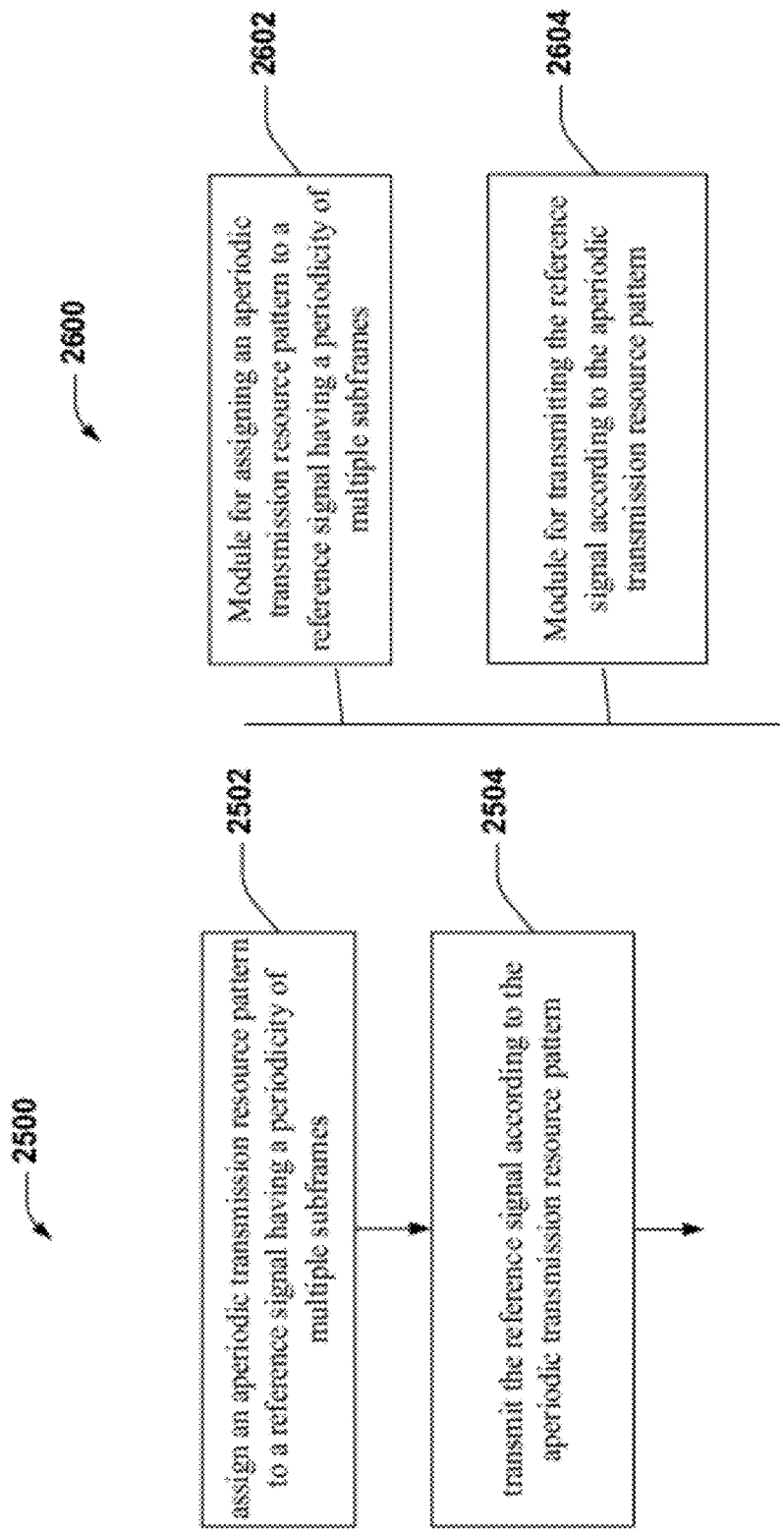

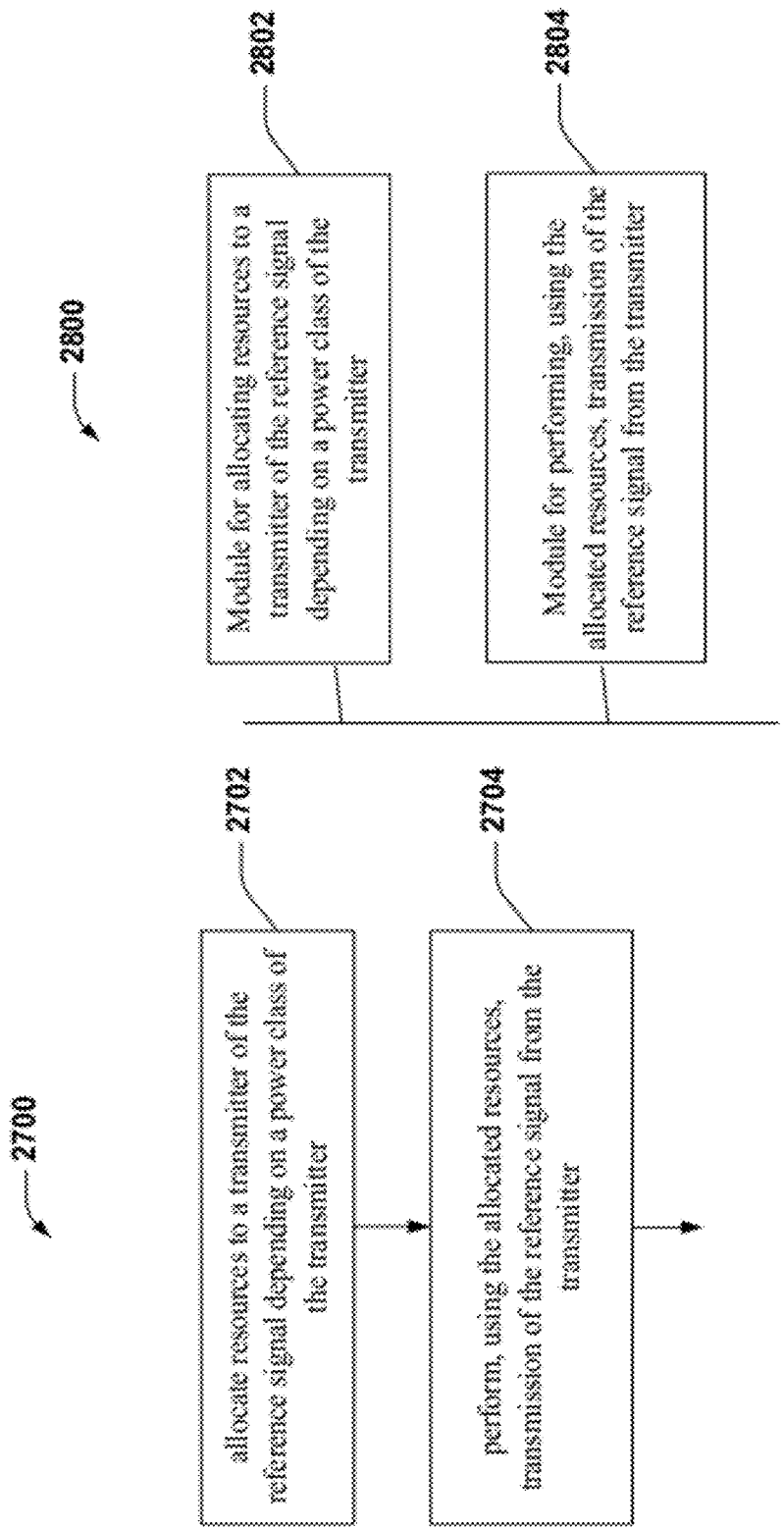

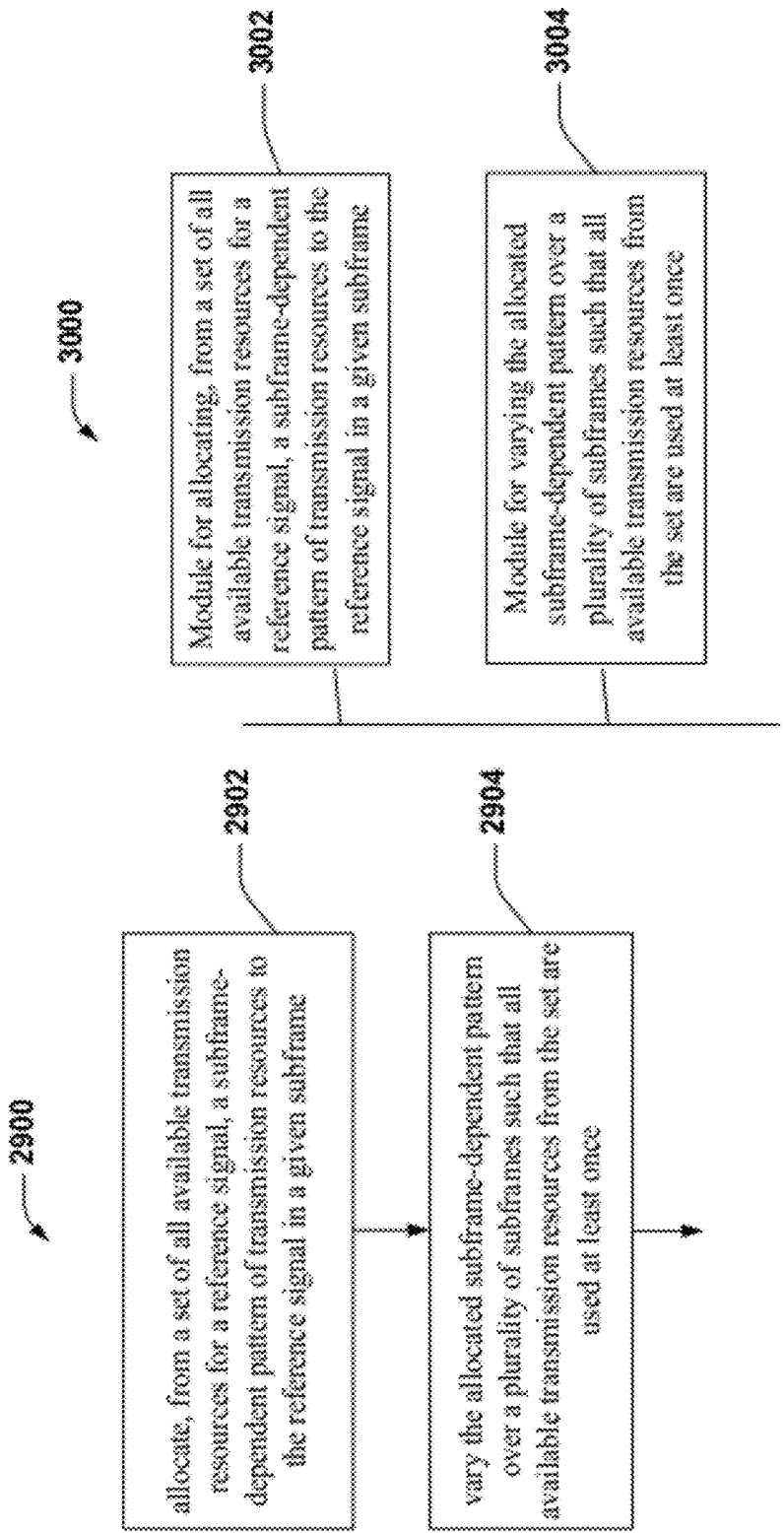

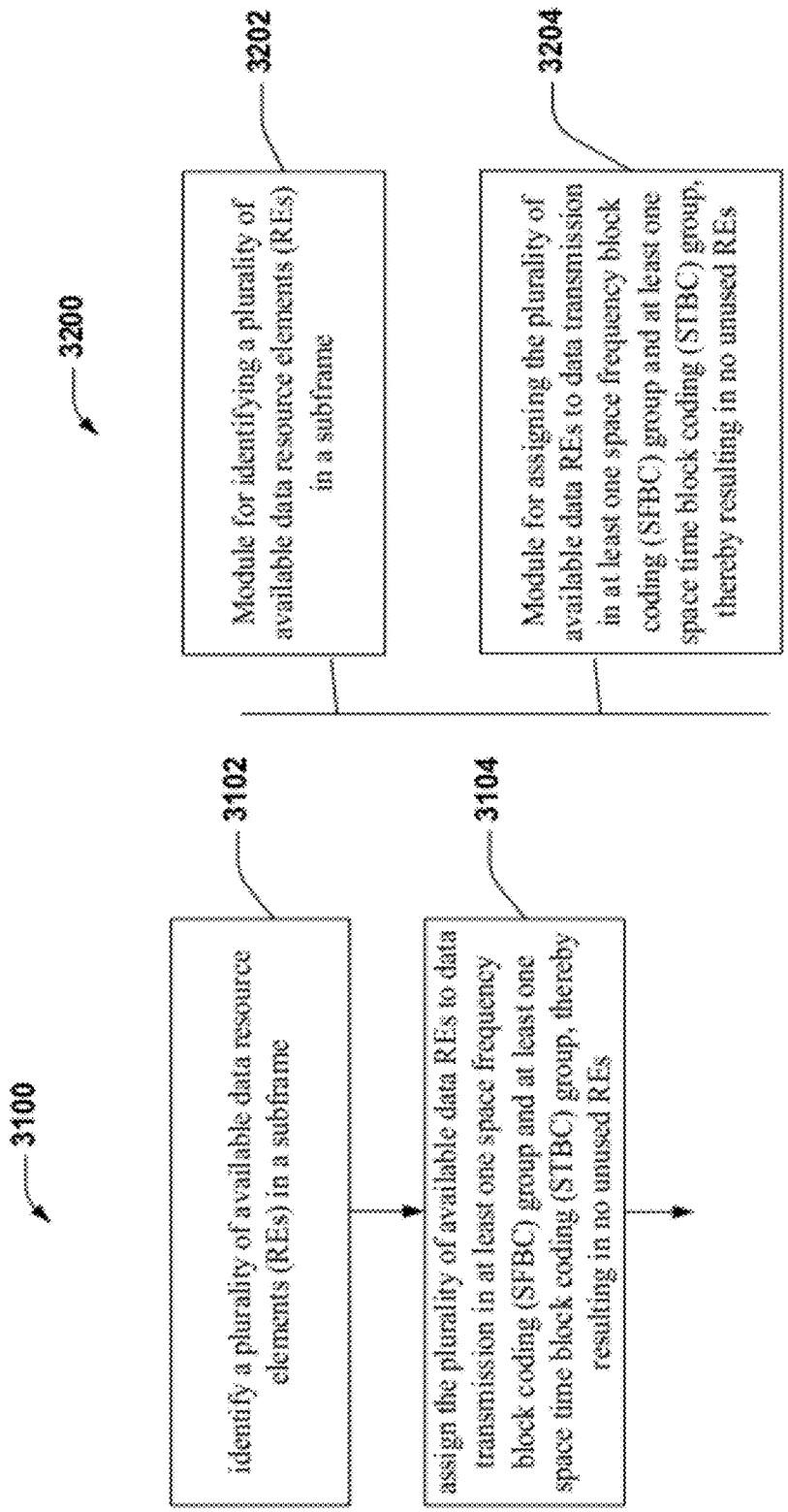

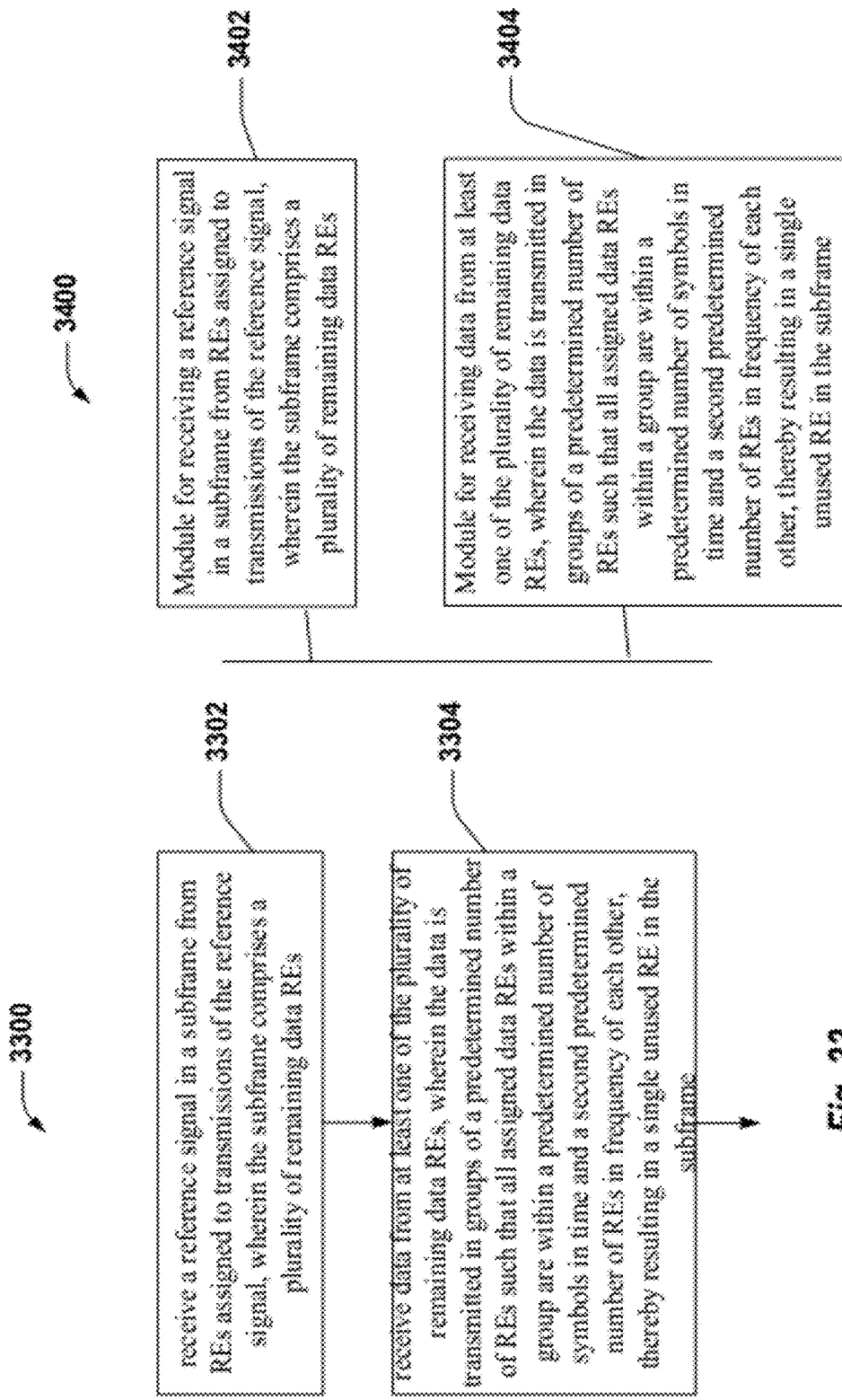

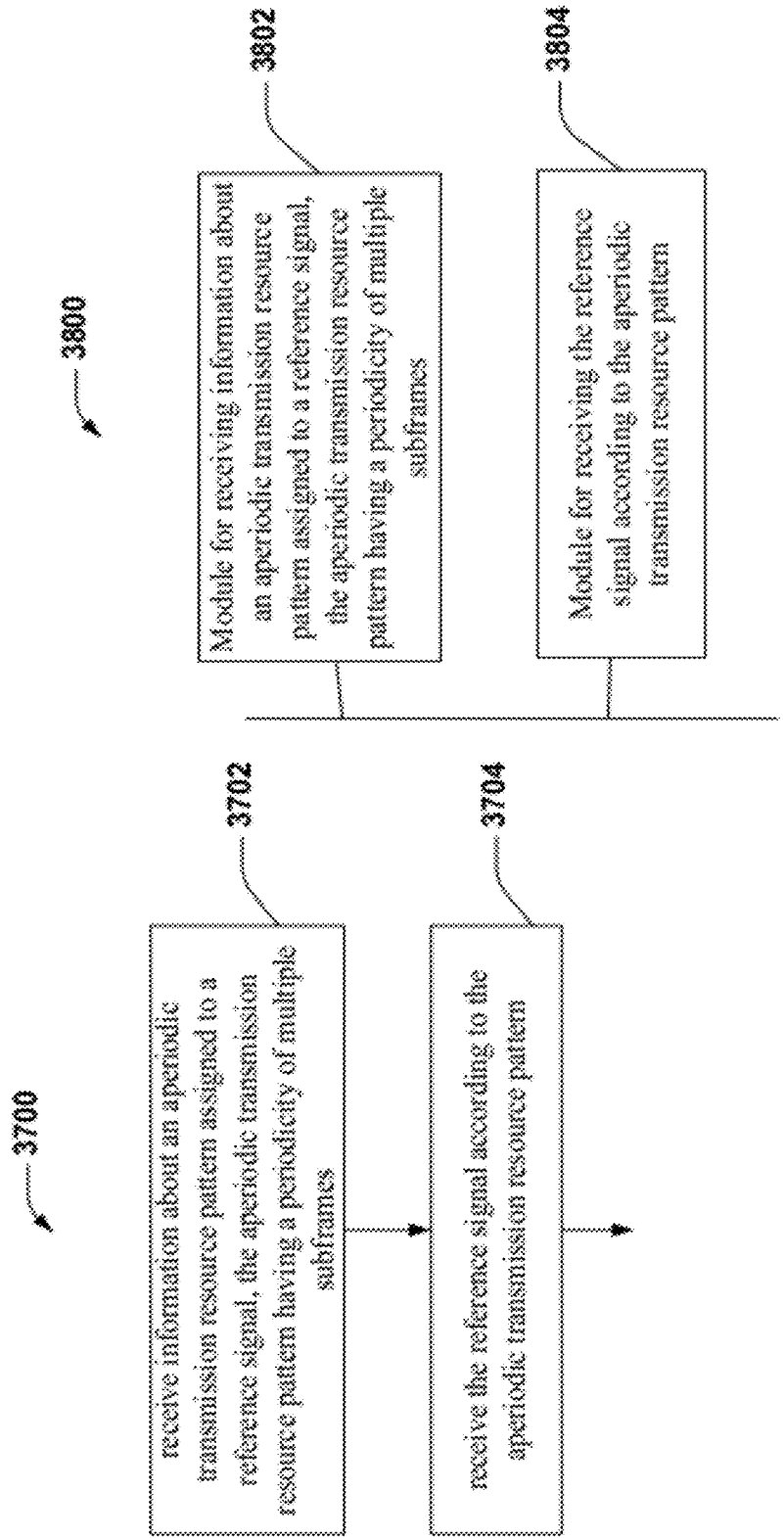

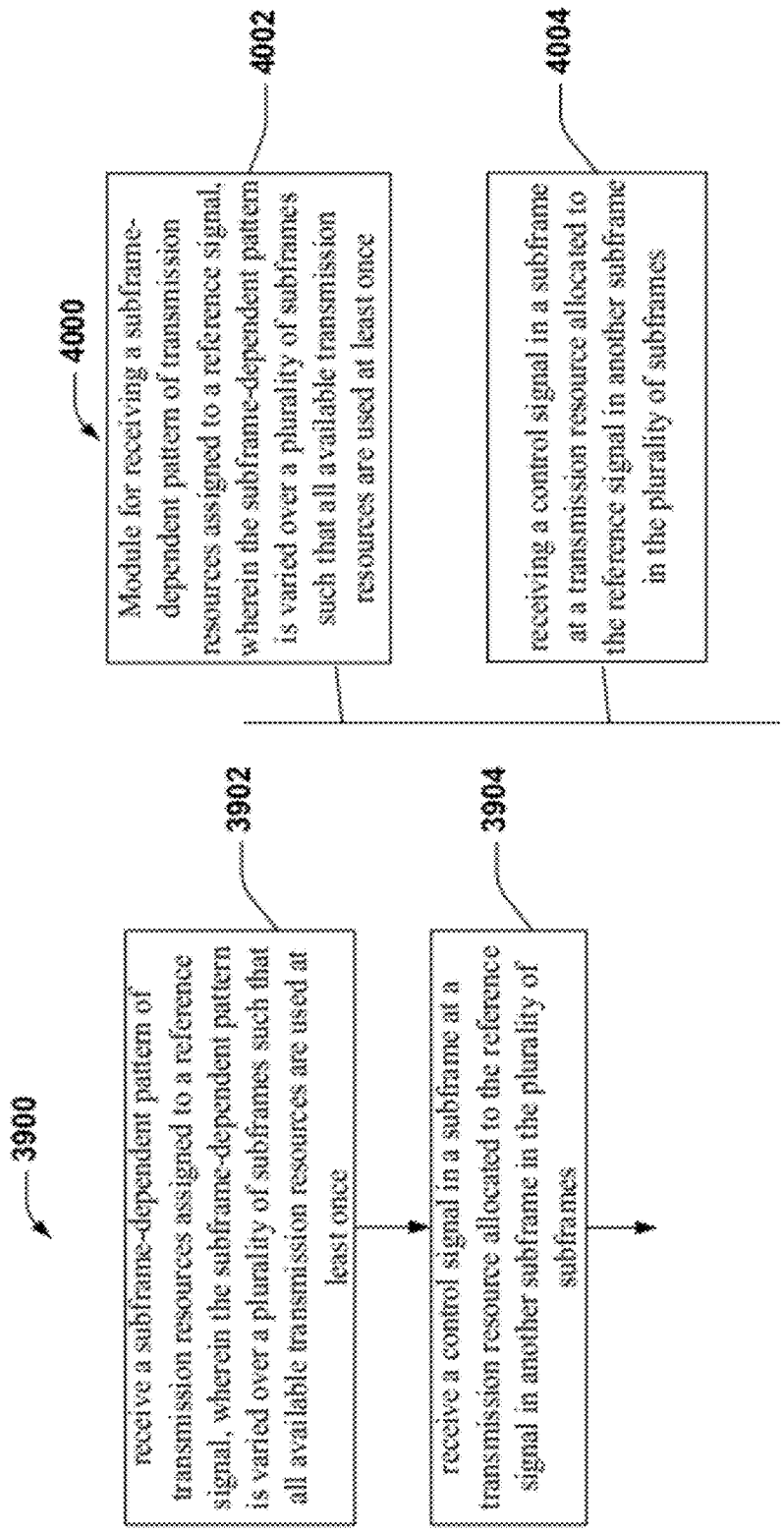

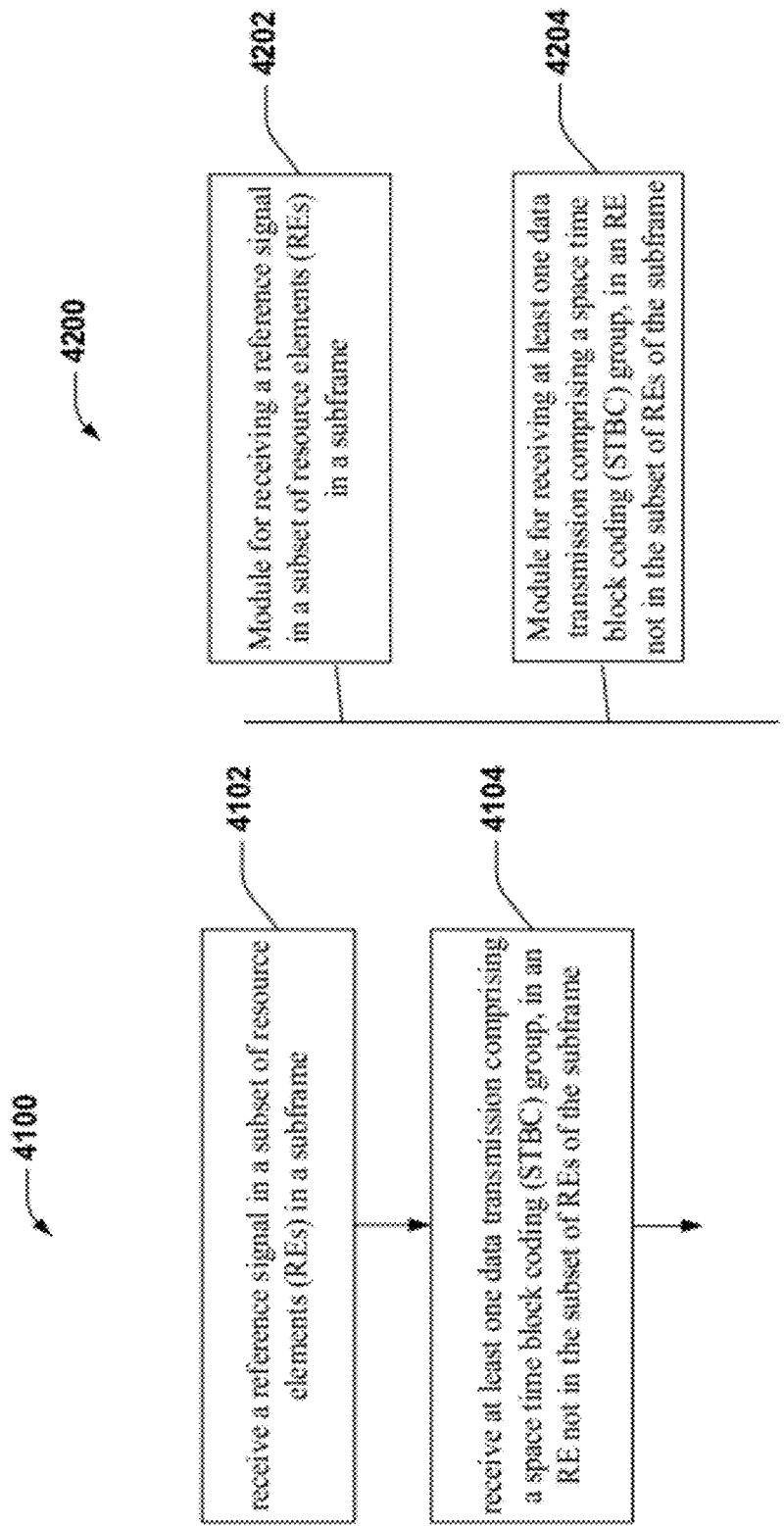

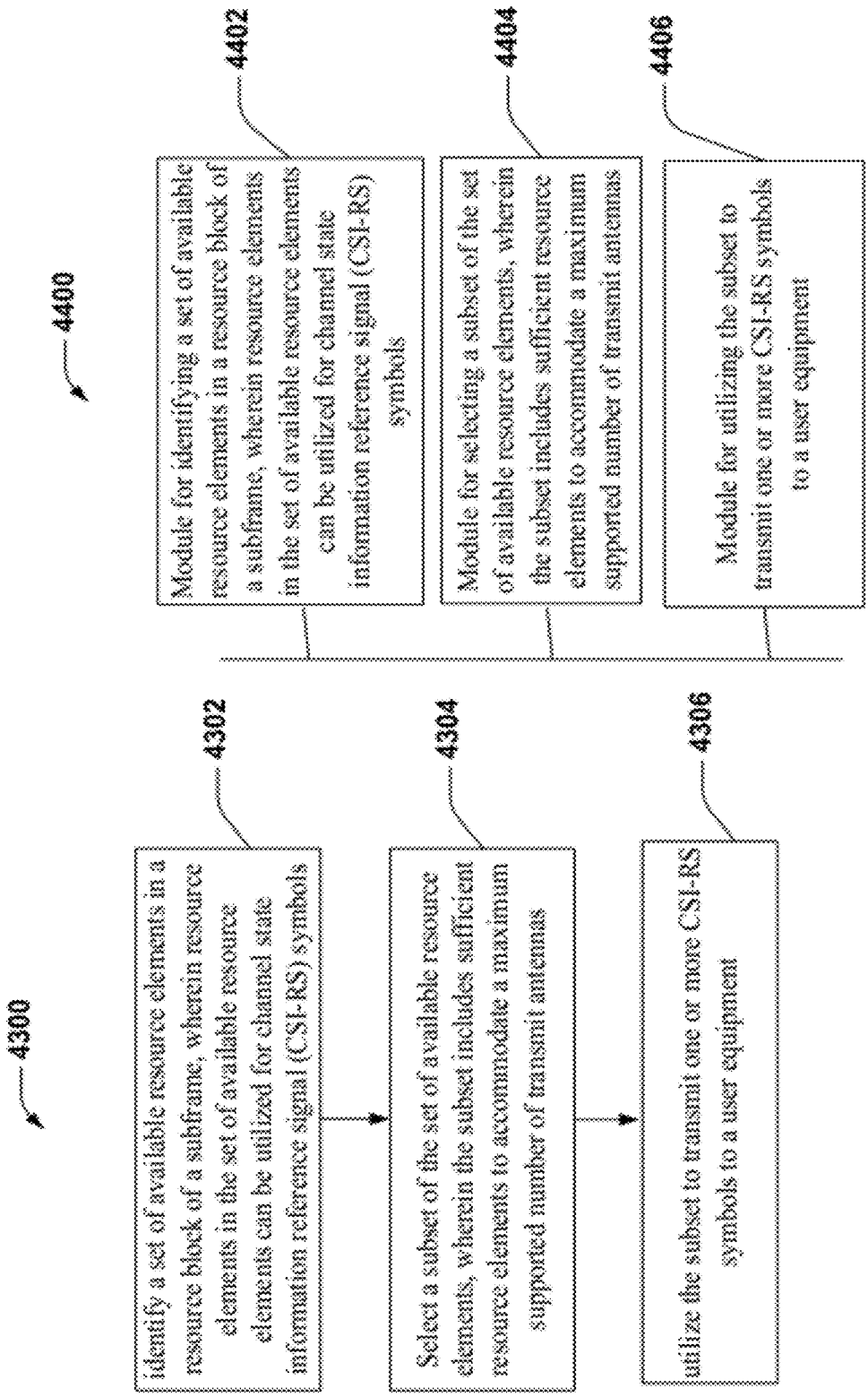

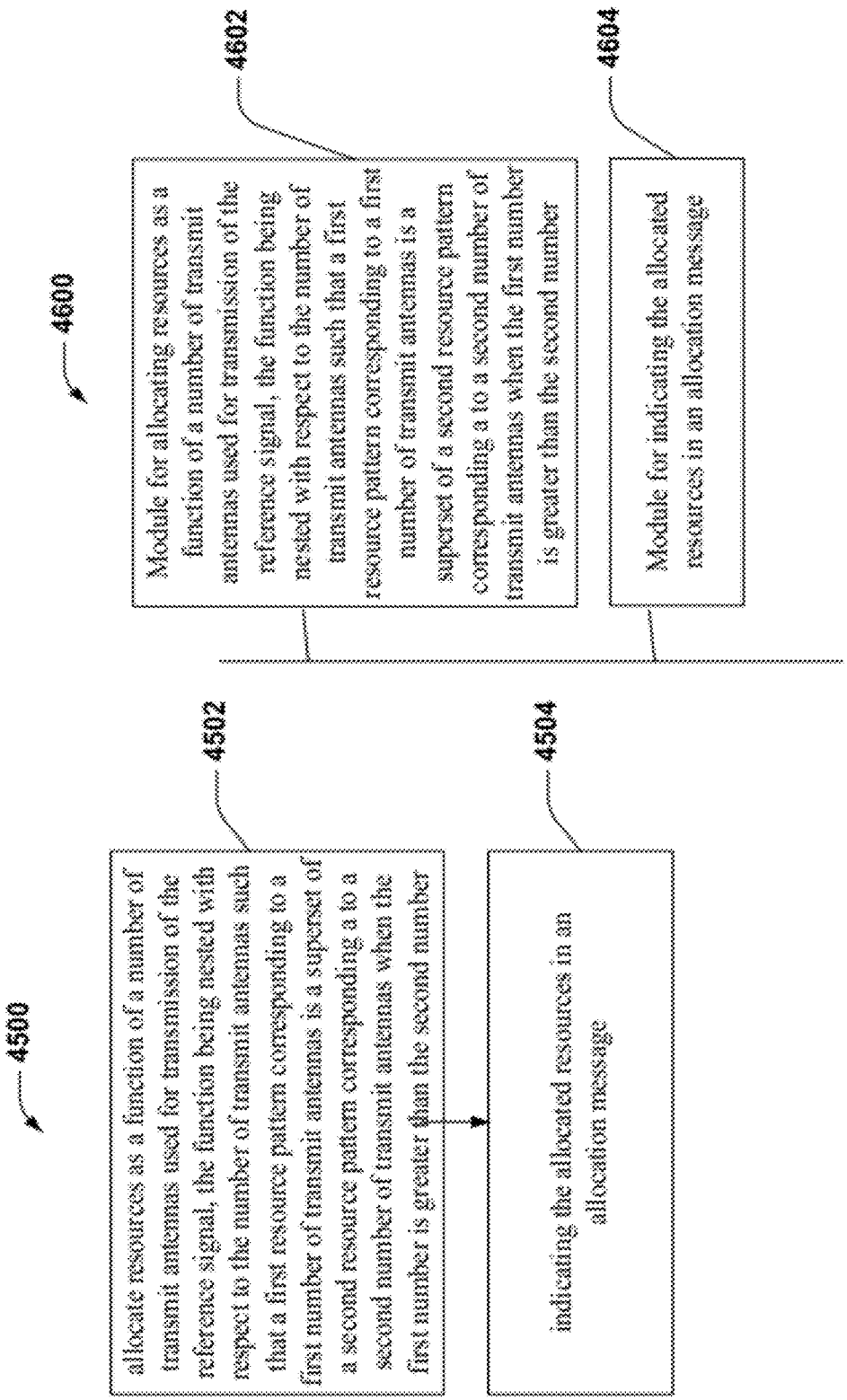

CHANNEL STATE INFORMATION REFERENCE SIGNALS

CROSS-REFERENCE TO RELATED APPLICATIONS

This application claims the benefit of priority from U.S. Provisional Patent Application Ser. No. 61/307,413, entitled "CHANNEL STATE INFORMATION REFERENCE SIGNALS," filed on Feb. 23, 2010, U.S. Provisional Patent Application Ser. No. 61/307,758, entitled "CHANNEL STATE INFORMATION REFERENCE SIGNALS," filed on Feb. 24, 2010, U.S. Provisional Patent Application Ser. No. 61/374,556, entitled "CHANNEL STATE INFORMATION REFERENCE SIGNALS" filed on Aug. 17, 2010 and U.S. Provisional Patent Application Ser. No. 61/438,183, entitled "CHANNEL STATE INFORMATION REFERENCE SIGNALS," filed on Jan. 31, 2011, each of which is herein incorporated by reference in its entirety.

BACKGROUND

I. Field

The following description relates generally to wireless communications, and more particularly to the use of channel state information reference signals in a wireless communication system.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In addition, a base station or a mobile terminal can transmit reference signals to maintain or improve performance of the wireless system. Reference signals are typically signals known a priori to a receiver. A receiving device may receive reference signals and based on the received reference signals may alter certain operational parameters or generate feedback to alter certain operational parameters of wireless communication. While reference signals may thus be useful, the transmission of reference signals may take bandwidth away from other useful signals such as data or control signals. With the increase in the demand on wireless data bandwidth, there is a greater demand on efficient use of existing reference signals. Furthermore, the assignment of transmission resources to new reference signals may possibly reduce the transmission resources available to pre-existing reference signals or data signals. Furthermore, new reference signals may be transmitted using transmission resources in which legacy user equipment may be expecting data transmissions.

SUMMARY

The systems and methods provided in this disclosure meet the above discussed needs, and others. Briefly and in general terms, the disclosed designs, in one aspect, provide methods and apparatuses for the use of channel state information reference signals (CSI-RS) and muted resource elements in a wireless communication network.

The following presents a summary of one or more embodiments in order to provide a basic understanding of such techniques and embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In one aspect, a method for wireless communication comprises identifying a plurality of available data resource elements (REs) in a subframe and assigning REs from the plurality of available data REs for data transmission to a wireless device in groups of a predetermined number of REs such that all assigned data REs within a group are within a predetermined number of symbols of each other in time domain and within a second predetermined number of subcarriers of each other in frequency domain, thereby resulting in at least one unused RE.

In another aspect, an apparatus for wireless communication comprises means for identifying a plurality of available data resource elements (REs) in a subframe and means for assigning REs from the plurality of available data REs for data transmission to a wireless device in groups of a first predetermined number of REs such that all assigned data REs within a group are within a predetermined number of symbols of each other in time domain and within a second predetermined number of subcarriers of each other in frequency domain, thereby resulting in at least one ungrouped RE.

In yet another aspect, a computer program product comprising a non-volatile computer readable medium storing computer executable instructions is disclosed. The instructions comprise code for identifying a plurality of available data resource elements (REs) in a subframe and assigning REs from the plurality of available data REs for data transmission to a wireless device in groups of a first predetermined number of REs such that all assigned data REs within a group are within a predetermined number of symbols of each other in time domain and within a second predetermined number of subcarriers of each other in frequency domain, thereby resulting in at least one ungrouped RE.

In yet another aspect, a wireless communication processor is disclosed. The wireless processor is configured to identify a plurality of available data resource elements (REs) in a subframe and assign REs from the plurality of available data REs for data transmission to a wireless device in groups of a first predetermined number of REs such that all assigned data REs within a group are within a predetermined number of symbols of each other in time domain and within a second predetermined number of subcarriers of each other in frequency domain, thereby resulting in at least one ungrouped RE.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 5 is a block diagram representation of a resource pattern used in a wireless communication system comprising 2 channel state information reference signal (CSI-RS) ports.

FIG. 20 is a block diagram representation of a resource pattern allocation in a wireless communication system.

FIG. 21 is a flow chart representation of a process for wireless communication.

FIG. 22 is a block diagram representation of a portion of a wireless communication apparatus.

FIG. 23 is a flow chart representation of a process for wireless communication.

FIG. 24 is a block diagram representation of a portion of a wireless communication apparatus FIG. 25 is a flow chart representation of a process for wireless communication.

FIG. 26 is a block diagram representation of a portion of a wireless communication apparatus FIG. 27 is a flow chart representation of a process for wireless communication.

FIG. 28 is a block diagram representation of a portion of a wireless communication apparatus.

FIG. 29 is a flow chart representation of a process for wireless communication.

FIG. 30 is a block diagram representation of a portion of a wireless communication apparatus.

FIG. 31 is a flow chart representation of a process for wireless communication.

FIG. 32 is a block diagram representation of a portion of a wireless communication apparatus.

FIG. 33 is a flow chart representation of a process for wireless communication.

FIG. 34 is a block diagram representation of a portion of a wireless communication apparatus.

FIG. 37 is a flow chart representation of a process for wireless communication.

FIG. 38 is a block diagram representation of a portion of a wireless communication apparatus.

FIG. 39 is a flow chart representation of a process for wireless communication.

FIG. 40 is a block diagram representation of a portion of a wireless communication apparatus.

FIG. 41 is a flow chart representation of a process for wireless communication.

FIG. 42 is a block diagram representation of a portion of a wireless communication apparatus.

FIG. 43 is a flow chart representation of a process for wireless communication.

FIG. 44 is a block diagram representation of a portion of a wireless communication apparatus.

FIG. 45 is a flow chart representation of a process for wireless communication.

FIG. 46 is a block diagram representation of a portion of a wireless communication apparatus.

DESCRIPTION

Figure 1:
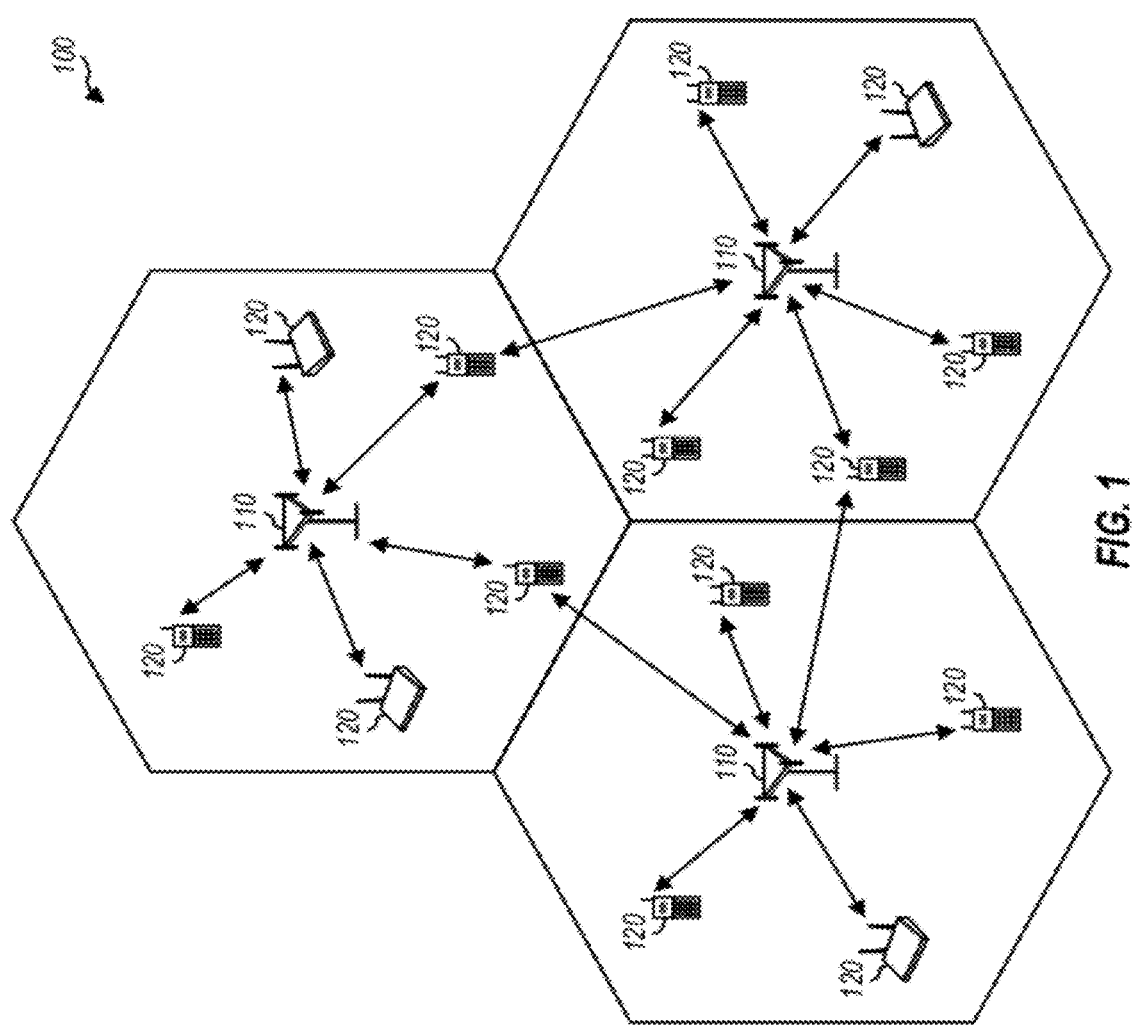
FIG. 1 illustrates a multiple access wireless communication system according to one embodiment.
Figure 2:
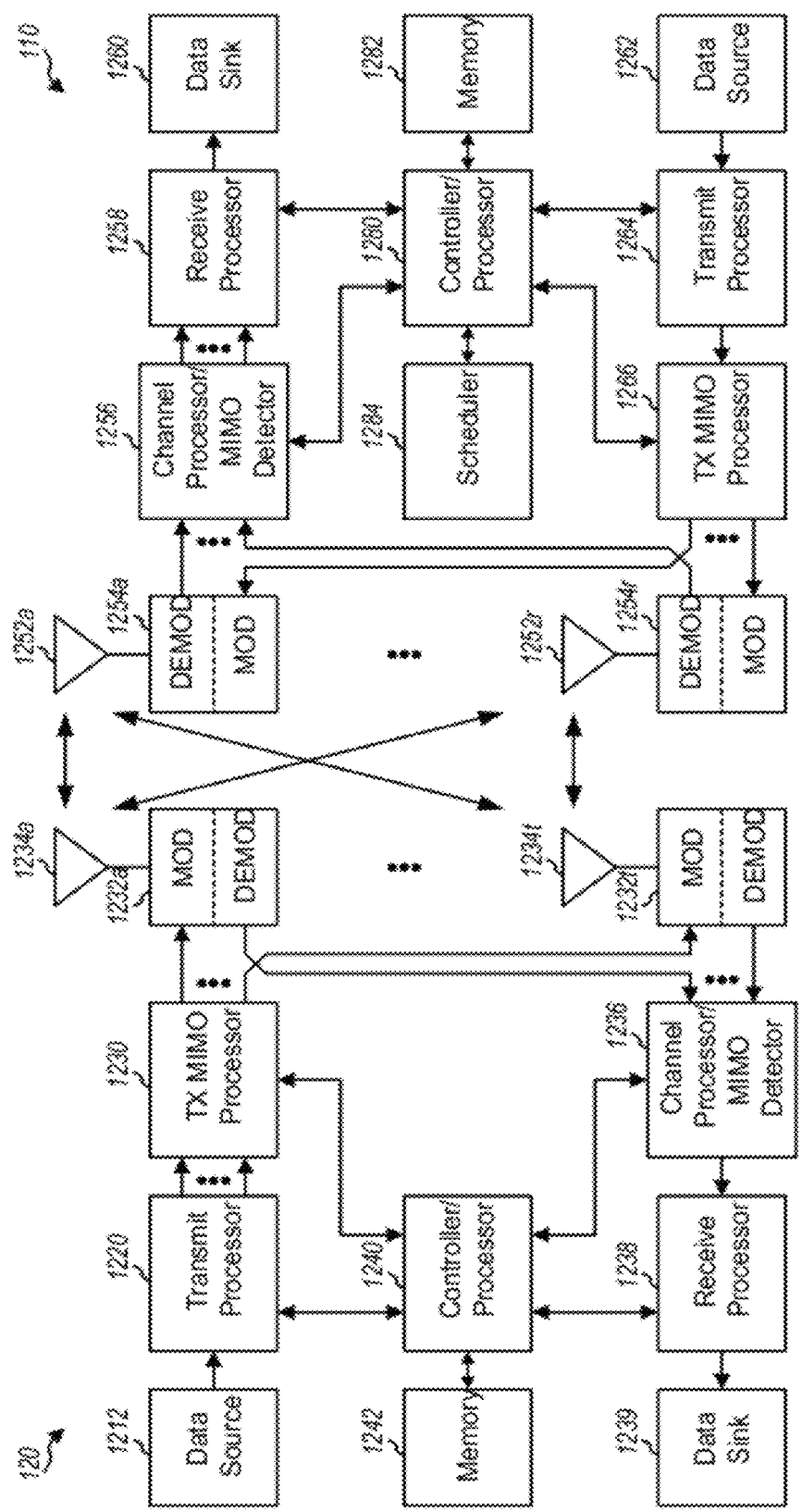
FIG. 2 illustrates a block diagram of a communication system.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA) utilizes single carrier modulation and frequency domain equalization. SC-FDMA signal has lower peak-to-average power ratio (PAPR) because of its inherent single carrier structure which may greatly benefit the mobile terminal in terms of transmit power efficiency. It is currently used for uplink multiple access scheme in 3GPP Long Term Evolution (LTE).

It should be noted that for clarity, the subject matter below is discussed with respect to specific examples of certain signals and message formats used in LTE and with respect to the channel state information reference signal (CSI-RS) and muting technology. However, the applicability of the disclosed techniques to other communication systems and other reference signal transmission/reception technology will be appreciated by one of skill in the art.

Furthermore, various combinations of antenna ports and transmission resource assignments are depicted in FIGS. 3 to 13 using a resource block map technique in which a two dimensional plot of available resources in a transmission resource block (RB) are depicted with symbols (or time) along the horizontal direction and frequency (or subcarrier index) along the vertical direction. Furthermore, for sake of clarity, the resource elements (REs) in each depicted RB are labeled with a corresponding antenna port group/antenna index, which simply represent logical grouping of antennas. However, it is understood that the enumeration using alphabet sequence and numbers is for clarity of explanation only, and may or may not bear any relationship with an actual antenna arrangement on a device.

CSI-RS are signals transmitted by an eNB to enable UE to estimate the DL channel and send feedback about the channel to the eNB. CSI-RS are planned to be introduced in LTE-A to be used for feedback to supporting SU-MIMO, MU-MIMO and CoMP. Since LTE Release 8 UEs (legacy UEs) are not aware of the CSI-RS they continue to behave as if it isn't present which makes it challenging to introduce the CSI-RS. The CSI-RS is planned to be included in the PDSCH region. There are some more restrictions on where CSI-RS can be placed.

In some designs, transmission resources allocated to CSI-RS may avoid REs allocated to other reference signals such as the Common Reference signal (CRS). In addition, in some designs, the entire symbol on which CRS REs are allocated may be avoided for CSI-RS. Such an avoidance of CRS symbols by CSI-RS may be helpful to minimize interference from CRS transmissions into CSI-RS transmissions. For example, if CRS and CSI-RS of a cell are on the same symbol, CRS power boosting could reduce CSI-RS power and CRS of neighboring cells could collide with the CSI-RS in synchronous networks which could make the channel estimation from CSI-RS unreliable in a given cell. In some designs, two-transmit antenna (2Tx) CSI-RS assignments may also avoid CRS symbols for all four-transmit antenna (4Tx) REs because neighboring cells could be using 4Tx antennas.

Furthermore, in some designs, CSI-RS may avoid the first three OFDM symbols in a resource block (RB) because the first three symbols could used for transmission of control signals ("control symbols"). Avoiding control symbols may also be useful in relay operation because a relay node may need to both transmit and receive CSI-RS. In relay designs where relay advertises its backhaul DL subframes as MBSFN to its UEs 120, the relay may not be able to listen to the first few (one to three) OFDM symbols.

In some transmission modes, UE-specific reference signals (UE-RS), also called Demodulation reference signal (DM-RS) may be transmitted by an eNB 110 to the UE 120 to help the UE 120 estimate the channel for data demodulation. In some designs, CSI-RS pattern may not depend on whether UE-RS based transmissions are scheduled or not. Therefore, in some designs, the REs allocated to CSI-RS may be selected to avoid UE-RS. As used herein, allocating or assigning REs to CSI-RS transmissions implies designating certain REs as being available for reference signal transmissions. As further explained below, the designated REs may or may not be used for actual reference signal transmissions, depending on other considerations such as muting. In some designs, CSI-RS are assigned transmission resources by avoiding an overlap with REs allocated to other signals, such as the CRS and UE-RS. As a result, in some designs, a total of 60 RE ports may therefore be available on subframes not containing REs allocated to other control or reference signals (e.g., on normal subframe with normal CP). In some designs, additionally, CSI-RS may avoid colliding with synchronization signals and PBCH and SIBs. In some designs, as explained in greater detail later, CSI-RS RE allocation may also avoid overlap with paging channel of legacy UEs 120.

Figure 3:
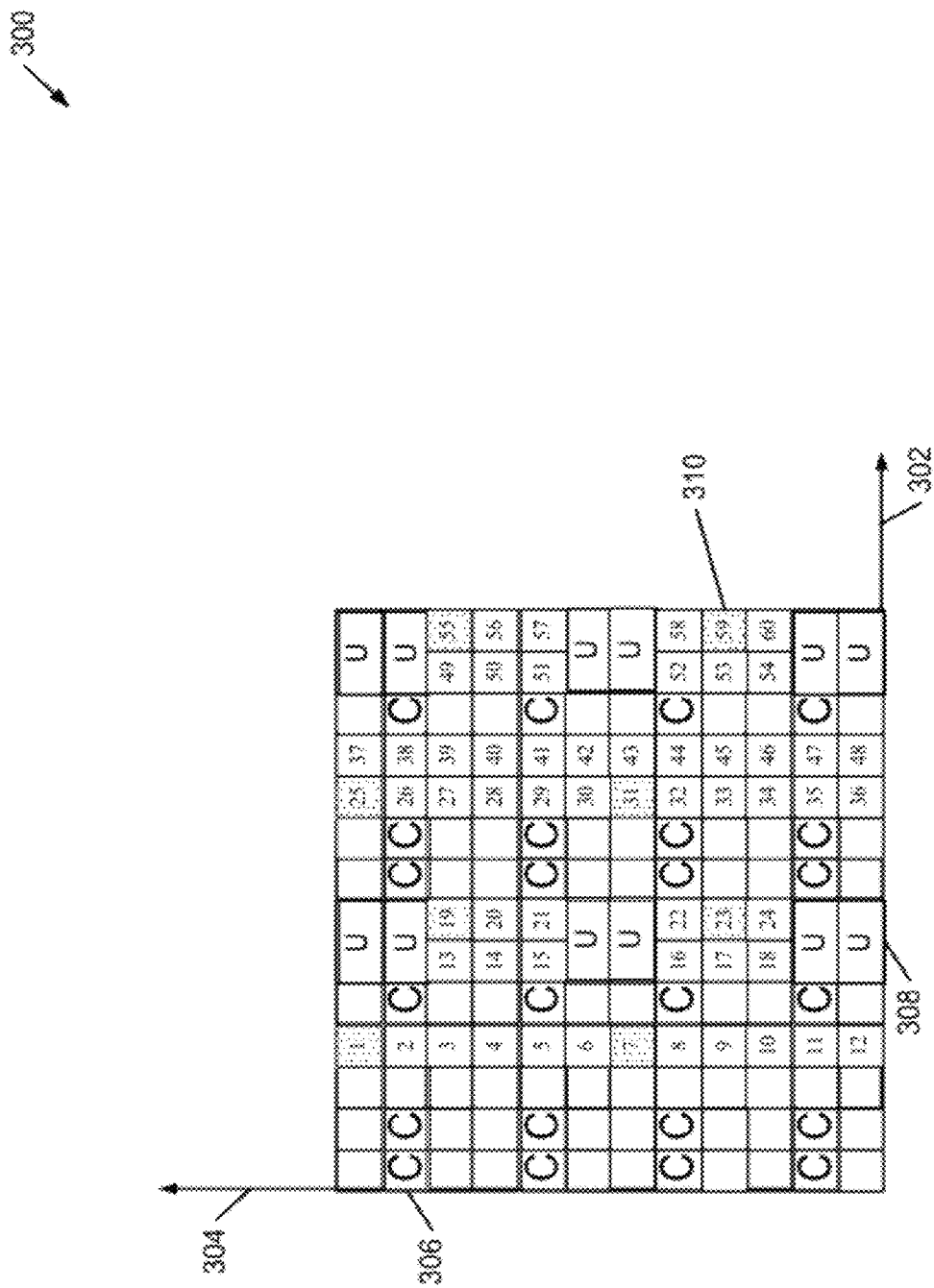
FIG. 3 is a block diagram representation of a resource block used in a wireless communication system.

FIG. 3 is a block diagram representation of a resource block 300 used in a wireless communication system. The horizontal axis 302 represents time (or symbol index) and the vertical axis 304 represents frequency. Each square tile represents a resource element (RE), representing a quantum of time-frequency transmission resource. The REs marked "C" (e.g., RE 306) may represent REs allocated to CRS transmissions. The RES marked "U" (e.g., RE 308) may represent REs allocated to UE-RS transmissions. The REs numbered from 1 to 60 (e.g., REs 310) may correspond to REs available for CSI-RS transmissions. In a given cell, the eNB 110 may select a subset from among all possible REs and allocate the REs in the selected subset to the transmission of CSI-RS in that cell. The remaining REs may be used for data transmissions, as further described below.

In some designs, CSI-RS transmissions may be used as a common pilot for several UEs 120. Because feedback may be desirable for the entire bandwidth occupied by a wireless channel, CSI-RS typically may be transmitted over a wide bandwidth on the subframes where CSI-RS is present. In multiple antenna systems, CSI-RS may be transmitted to enable independent channel estimation of all transmit antennas. In various designs, CSI-RS transmissions of different antenna ports may be multiplexed in time domain, frequency domain and/or code domain. For example, in a combined time/frequency domain multiplexing design, REs allocated to CSI-RS transmissions from different antenna ports may comprise different RE patterns. However, in some designs, all CSI-RS transmissions (for all antennas) of a cell may be allocated transmission resource on the same subframe so that from the perspective of a UE 120, channel estimation for all antenna ports may be performed by receiving CSI-RS transmissions during the used subframe. Such a selective CSI-RS processing from a same subframe may help power management (e.g., the UE 120 may not need to stay on to receive multiple subframes of CSI-RS transmissions).

In some wireless systems, such as cooperative multipoint (CoMP) or heterogeneous networks (HetNet), the eNB 110 may desire for the UE 120 to measure channels of neighboring cells. In such designs, the CSI-RS transmissions of some cells may be orthogonalized (e.g., use different set of REs). For example, in some designs, an eNB 110 may "blank" out REs (e.g., no transmissions or muting) allocated to CSI-RS transmissions in a neighboring cell. The allocated RE patterns of different neighboring cells may be coordinate by eNBs 110 with each other.

In some designs, CSI-RS REs allocated to a particular transmit antenna port may be chosen such that the entire bandwidth of the channel is uniformly sampled by the REs assigned to the transmit antenna port. Due to time variations in the channel characteristics, is may be desirable to have all the CSI-RS REs of a particular antenna port to be close to each other or on the same OFDM symbol. For example, in some designs, REs marked 1, 7, 19, 23, 25, 31, 55 and 59 in FIG. 3 may be used for 8 different antenna ports, thereby providing a pattern repeating every RB that is uniformly spaced in the frequency band.

In some designs, transmission resources may be allocated for the transmission of CSI-RS to antenna on the OFDM symbols on which CSI-RS is transmitted, to allow full power utilization. For example, because CSI-RS may be typically transmitted at a given time only from a single antenna port, the power allocated to other antenna ports may not be usable. However, if multiple CSI-RS antenna port REs are allocated on one OFDM symbol, the CSI-RS of an active antenna port (i.e., antenna port actually transmitting the signal) can also use the power allocated to that antenna port that is not used for an actual signal transmission.

A legacy UE 120 (such as a Rel-8 UE 120 in a Rel-10 network) may not be aware of CSI-RS transmissions and may assume that data is being transmitted in REs allocated to CSI-RS. In some designs, legacy UEs 120 may assume that the data transmissions use space frequency block coding (SFBC) when 2 CRS ports are configured and SFBC-FSTD when 4 CRS antenna ports are configured. In some designs, the SFBC and SFBC frequency shift time diversity (FSTD) schemes may comprise transmitting 2 data symbols on 2 contiguous in frequency data REs (skipping any intervening CRS REs) using Alamouti scheme. To minimize the impact of the CSI-RS puncturing on UEs 120 scheduled using these schemes, the number of pairs of REs involved in the Alamouti scheme that are impacted by the puncturing may be minimized. As further explained below, instead of puncturing 2 REs in two different RE pairs, both REs in one pair may be punctured instead.

In some designs, SFBC-FSTD may use SFBC using antenna port 0, 2 on first 2 data REs and antenna ports 1, 3 on the next 2 data REs in a given group of four data REs. The term "data RE" in general refers to a resource element that is understood by a legacy UE 120 as being available for data transmission. However, depending on the assignment of reference signal transmission resources and muting, a data RE may, in some instances, be used for transmission of other signals, or may not be used for transmission at all. In some designs, the two REs employed in SFBC may be selected to be close to each other so that the channel estimates on the two REs are nearly the same. In some designs, Rel-10 UEs 120 scheduled using such a scheme may employ contiguous data REs in frequency (skipping any intermediate CSI-RS REs and the CRS REs). The mapping may be done in groups of 4 REs in frequency for SFBC-FSTD (2 REs in freq for SFBC). In the case when the number of available data REs is not a multiple of 4, e.g., when it is 4n+2, FSTD can be employed n times and SFBC using two antenna port can be used for the remaining 2 REs. This may introduce power imbalance. It may be desirable to introduce CSI-RS such that the number of available data REs on each symbol of an RB may be a multiple of 4 for 4-CRS (and 2 for 2-CRS) when scheduled using this mode.

When the number of available data REs (per RB or alternately per data allocation) is of form 4n+2 for SFBC-FSTD (or 2n+1 for SFBC) on two neighboring symbols (n integer) SFBC/SFBC-FSTD may be used in combination with STBC where Alamouti scheme is applied in time. This enables the use of all available REs while keeping the power balanced.

Figure 4A:
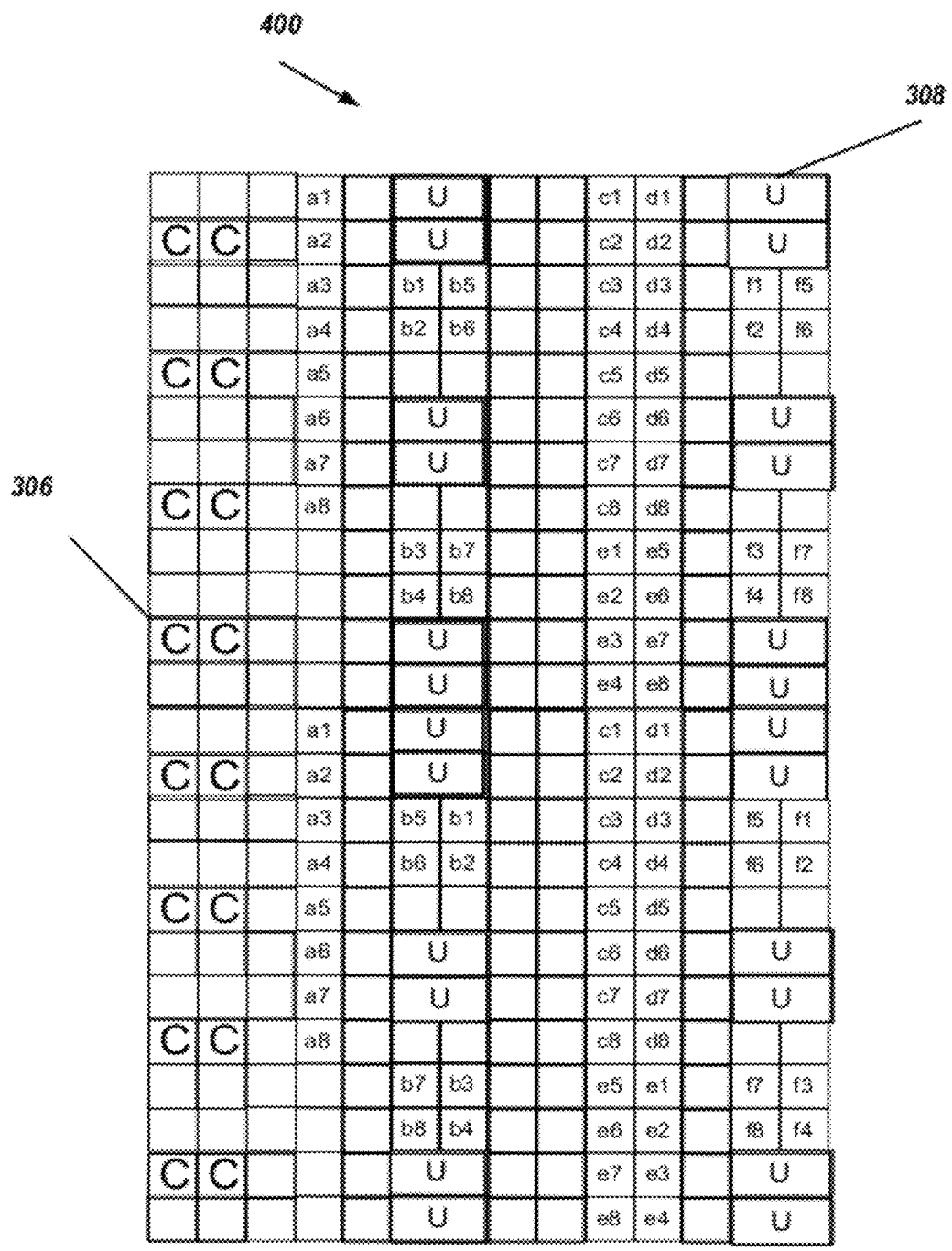
FIG. 4A is a block diagram representation of two adjacent resource blocks used in a wireless communication system.
Figure 4B:
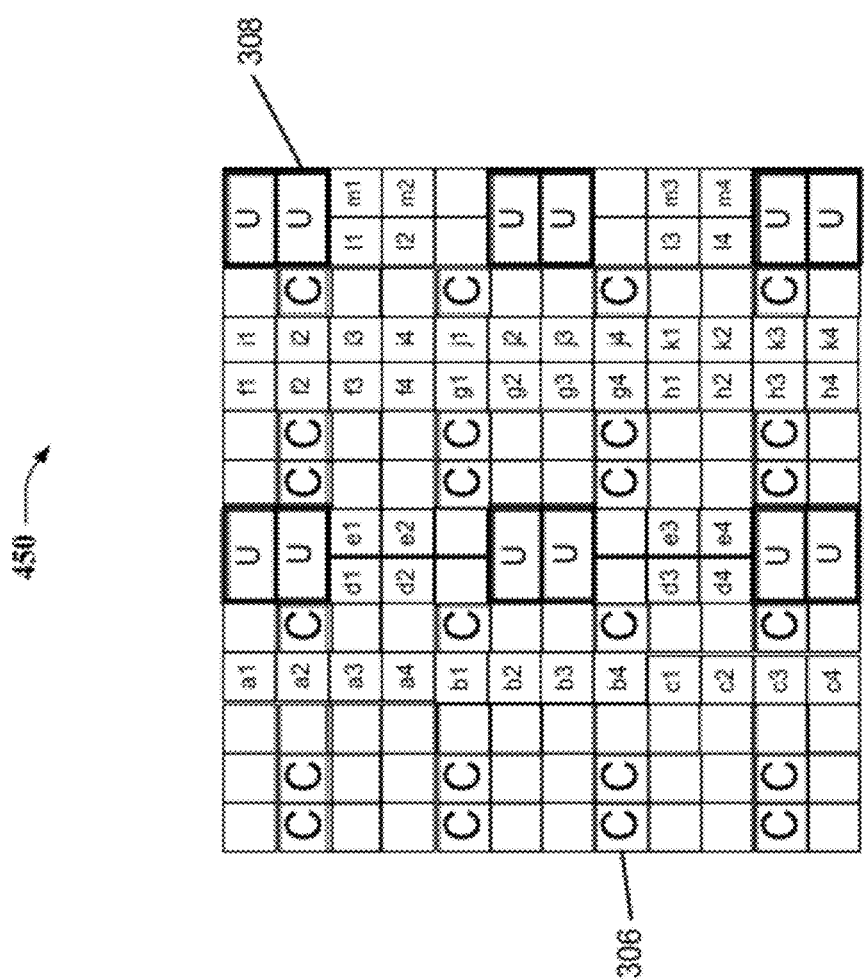
FIG. 4B is a block diagram representation of a resource block used in a wireless communication system

FIG. 4A is a block diagram representation 400 of two adjacent resource blocks, depicting REs assigned to CSI-RS, in some designs. The allocated REs are labeled using a two character combination of an alphabet (a, b, c, d, or f) representing a group of antenna ports and a number (1 to 8), representing an antenna port index. An eNB 110 with eight transmit antenna ports (8Tx) may select one of the groups "a" to "f" and may use the remaining CSI-RS REs for data transmissions. The RE assignment pattern depicted in FIG. 4B allows orthogonal multiplexing of 6 different eNBs 110 with 8Tx antennas each (each eNB 110 using one of the six groups "a" to "f"). The design assumes that a resource density of 1 RE/RB is use for CSI-RS.

Note that on OFDM symbols containing user equipment reference signal, or UE-RS, (e.g., symbols 450, 452), 6 REs (instead of 8) may be available for CSI-RS transmissions. In some designs, to accommodate 8 CSI-RS antenna ports, antenna ports 1 to 4 may be placed on a first OFDM symbol (e.g., symbol 450) of an OFDM symbol pair (e.g., 450, 452) containing UE-RS, and antenna ports 5 to 8 may be allocated REs on the next adjacent OFDM symbol (e.g., symbol 452). To enable full power boosting, the antenna port mapping for the symbols 450, 452 may be changed on the next RB, such that all ports are covered within the same symbol location in the neighboring RB. Neighboring symbols may be chosen in some design for allocation of CSI-RS resources to the same antenna group to advantageously use the fact that time variation in channel characteristics between adjacent symbols may be relatively small.

In some designs, 4Tx eNBs 110 may choose the CSI-RS ports {1, 2, 3, 4} or {5, 6, 7, 8} of one antenna group "a" to "f." In some designs, 2Tx eNBs 110 may choose RE pairs {1, 2}, {3, 4}, {5, 6}, {7, 8} in one group, for CSI-RS transmission. Therefore, antenna port assignment may be chosen such that even with the fewer number of CSI-RS antenna ports, all OFDM symbols containing CSI-RS REs of a particular eNB 110 have CSI-RS REs corresponding to all antenna ports. In one aspect, such an assignment of REs to antenna ports may make it easier to orthogonally multiplex eNBs 110 with different antenna configurations.

Figure 4C:
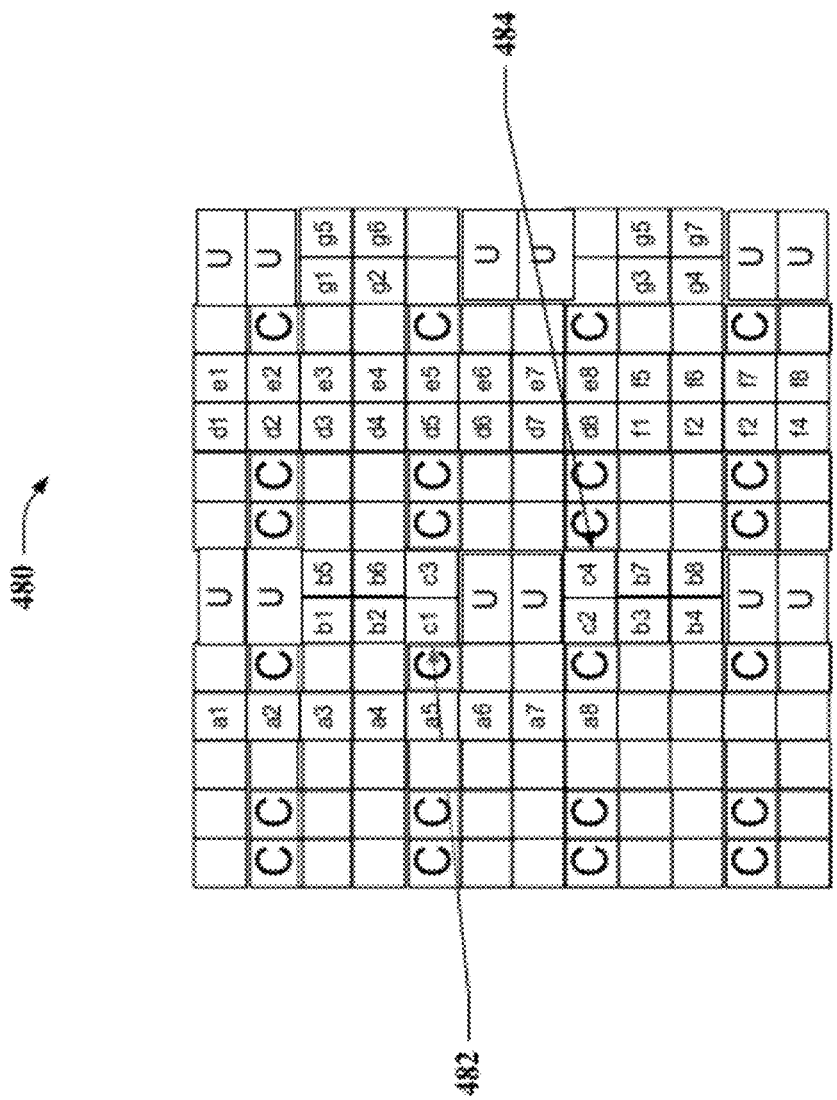
FIG. 4C is a block diagram representation of a resource block used in a wireless communication system

Referring now to FIG. 4C, a resource block 480 shows another was of assigning a resource pattern to 4 CSI-RS ports for 4Tx eNBs 110. In some designs, the depicted pattern of FIG. 4C may be repeated for every RB in which CSI-RS is assigned. It may be seen that the 4Tx assignment are fitted within 8Tx assignment by splitting the 8Tx assignments depicted in FIG. 4B into two groups for 4Tx. The 4Tx assignments may be further split into RE assignments for 2Tx eNBs 110.

It will be appreciated that in the depicted RE assignment of FIG. 4C, the CSI-RS REs have been chosen such that they puncture both data REs in an SFBC pair for legacy UEs 120. For example, if the CSI-RS assignment pattern was shifted down in vertical direction by one RE location on DM-RS symbols 482, 484, two REs in different SFBC pairs would have been punctured.

Typically the number of CSI-RS ports is larger than or equal to the number of CRS ports. It may also be appreciated that when the number of CRS is 4, the CSI-RS port assignment could be for 4 or 8 antenna ports, and the number of REs used by CSI-RS on any symbol may be 0, 4, or 8. In one aspect, such an assignment may ensure that a multiple of 4 REs are re-allocated to CSI-RS from the available data REs and hence no REs are left over ungrouped (i.e., orphan REs). Similarly when the number of CRS is 2, the number of CSI-RS antenna ports could be (2, 4, 8). In such a case the CSI-RS REs on any symbol may be either 0, 2, 4, or 8 ensuring that no orphan REs remain if SFBC is used. In some designs where the location of antenna port 3 and 4 are swapped with that of antenna ports 5, 6 the property that no orphan REs are left may not be met. Note that some REs that could have been used for CSI-RS may be left unused for CSI-RS to preserve this property of no-orphan data REs.

Referring to FIG. 4C, a block diagram representation of a resource block 480 is depicted, showing another exemplary assignment of REs to CSI-RS transmissions. In one aspect, the RE assignment in RB 480 differs from that in RB 450 in that the RE pairs 482 and 484 are assigned to CSI-RS in RB 480 and were left un-assigned (i.e., available to data transmissions) in RB 450 depicted in FIG. 4B. The problem when these REs 482, 484 are used for CSI-RS and how this problem can be overcome by using STBC is further explained below.

In some designs, when 2 REs are available for 4-CRS, using SFBC over 2 beams that the UE 120 is aware may be advantageously used to utilize full power instead for SFBC-FSTD. In some designs, when <4 REs are available for 4-CRS, or 1 RE for 2 CRS one modulation symbol along beams that UE 120 can estimate using CRS may be transmitted. In some designs, the additional REs 482, 484 may simply be skipped. Note that, in some designs, the REs that break the SFBC grouping may be allowed. Whether to use the REs for CSI-RS or whether to protect SFBC instead may be decided at the network level during the setting up of a network (e.g., by the eNB 110).

In some designs, for sounding channel quality of other cells, a UE 120 may be provided with information regarding where to look for CSI-RS of a neighboring cell, based on minimal information at the UE 120. To enable this, CSI-RS antenna patterns could be functions of one or more of a subframe index, a radio frame index, single frequency network (SFN) number and cell ID. Based on the information, the UE 120 may be able to locate CSI-RS transmissions from a neighboring eNB 110.

In some designs, as discussed above, changing of CSI-RS antenna patterns across RBs may, in one aspect, enable full power utilization when transmitting the CSI-RS signal from an antenna.

In some designs, the antenna port grouping of CSI-RS may be arranged to be orthogonal with each other such that groups of a given port size (e.g., 8, 4, 2 or 1) may be orthogonal to each other (e.g., due to time-frequency separation). In addition, a group with smaller number of antennas may form a sub-group of the group with a larger number of antennas. For example, CSI-RS resource allocation pattern for 8 antenna port groups may comprise two CSI-RS patterns for 4 antenna groups (4Tx), which in turn may comprise 2 CSI-RS allocations for 2-Tx port CSI-RS. Therefore, in some designs, REs are allocated for transmission of CSI-RS, as a function of a number of transmit antennas used for transmission of the reference signal (e.g., 8, 4 or 2), the function being nested with respect to the number of transmit antennas such that a first resource pattern corresponding to a first number (e.g., 8 or 4) of transmit antennas is a superset of a second resource pattern corresponding a to a second number of transmit antennas (e.g., 4 or 2) when the first number is greater than the second number.

In some designs, CSI-RS REs may be selected to be at RE locations such that the number of impacted SFBC RE pairs may be minimized (note that it may be a set of 2 REs even for SFBC-FSTD). In some designs the "minimization" may result in a single ungrouped RE in a symbol in which CSI-RS REs are allocated. In some designs, the minimization may result in zero ungrouped REs (i.e., all data REs get allocated to CSI-RS transmissions).

In some designs the coding method used for data transmission may be switched to STBC from SFBC/SFBC-FSTD, when the number of available REs is of form 2n+1 for SFBC and 4n+2 for SFBC-FSTD on neighboring OFDM symbols. This switching of data encoding method may, in one aspect, help minimize the number of orphan REs. In various designs, available REs may be computed on per RB basis or for the entire data allocation.

As further described below, REs may be allocated to CSI-RS transmission to cover different contiguous (or non-contiguous) parts of the channel bandwidth on different subframes, thereby covering the entire bandwidth when collectively seen across all subframes. The bandwidth and CSI-RS RE allocation patterns may be chosen such that the eNB 110 may avoid puncturing signal such as physical broadcast channel (PBCH), secondary synchronization signal (SSS), and mandated signal transmissions such as paging and system information blocks (SIBs). In some designs, the mandated transmissions of such signals as paging and SIBs, directed to legacy UEs 120, may be performed on RBs not containing CSI-RS and appear as expected by the legacy UEs 120, while these signals may be transmitted, directed to CSI-RS aware UEs 120, in other RBs selected by the eNB 110.

In some designs, CSI-RS antenna port space may be partitioned between eNBs 110 of different power class (more generally, two eNBs in which one is dominant interferer to another get different partition). For example, in some designs eNBs 110 for macro-cells get one set of CSI-RS REs, pico-cells get another set and femto-cells could get multiple sets of CSI-RS REs. In general, the dominant interferer may be configured to mute the CSI-RS space of the weaker eNB. The assignment based on power class may be static, semi-static (e.g., using a higher layer message), or dynamic. Cooperating cells in which one cell may mute the CSI-RS of the other cell and may select the CSI-RS pattern that they should use such that muting and CSI-RS transmissions happen on the same OFDM symbols, thereby enabling CSI-RS power boosting.

In some designs, code division multiplexing (CDM) may be use on the CSI-RS symbols (i.e., symbols on which REs are allocated to CSI-RS transmission). In one aspect, the use of CDM may address the previously discussed issue of power utilization. For example, instead of sending antenna port 1, 5 on different REs on two neighboring OFDM symbols, they can be code division multiplexed (CDM) over the two REs using two orthogonal sequences. In some designs, CDM may be used for higher rank (e.g., rank 8) DM-RS pattern FDM may be used for lower ranks (e.g., ranks 4 and 2).

Referring now to FIGS. 6 to 13, some example of RE assignments to CSI-RS signals, used in LTE Rel-10, are depicted. In FIGS. 6 to 13, the REs marked with "C" may represent REs assigned to CRS and the REs marked "U" may represent REs assigned to UE-RS.

Figure 6:
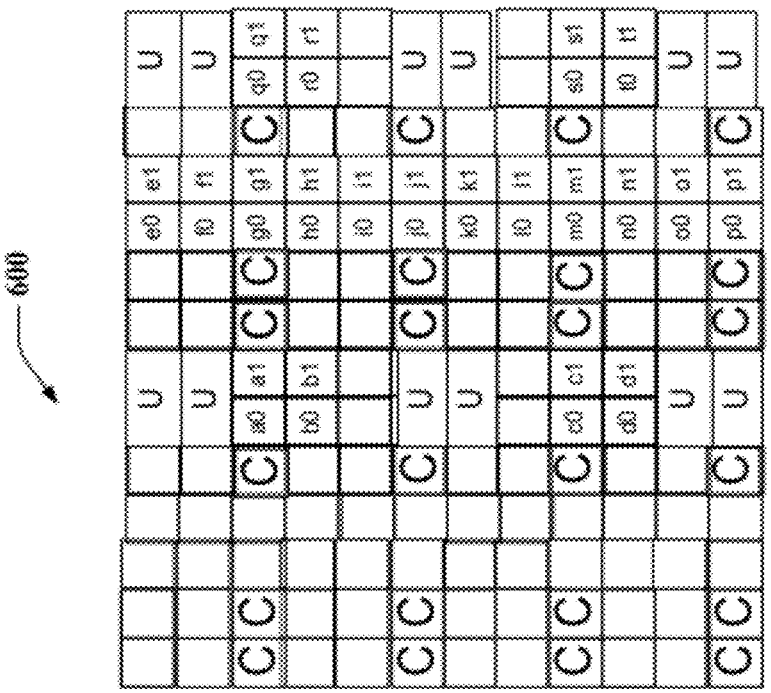
FIG. 6 is a block diagram representation of a resource block used in a wireless communication system comprising 4 channel state information reference signal (CSI-RS) ports.

FIG. 6 is a block diagram representation of an RB 600 showing the RE pattern assignment to CSI-RS for the case of 2 CSI-RS ports in normal cyclic prefix (CP) subframes, for both frame structures (FS) FS 1 and FS 2.

Figure 7:
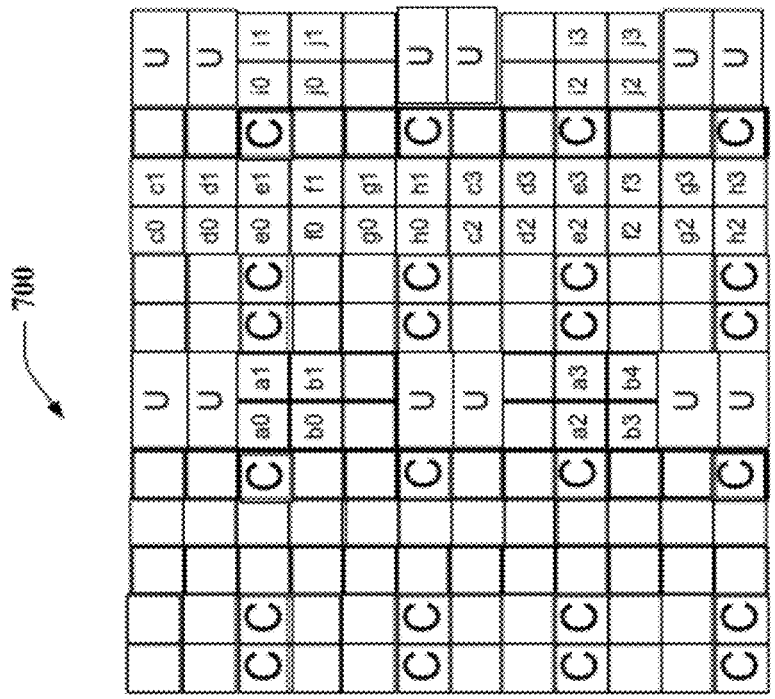
FIG. 7 is a block diagram representation of a resource block used in a wireless communication system comprising 8 channel state information reference signal (CSI-RS) ports.

FIG. 7 is a block diagram representation of an RB 700 showing the RE pattern assignment to CSI-RS for the case of 4 CSI-RS ports in normal cyclic prefix (CP) subframes, for both frame structures (FS) FS 1 and FS 2.

Figure 8:
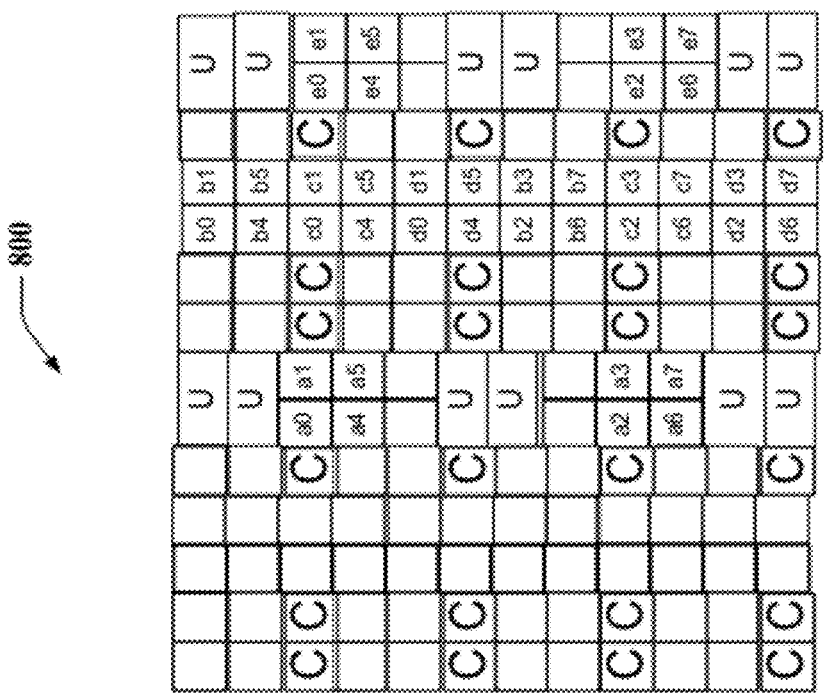
FIG. 8 is a block diagram representation of a resource block used in a wireless communication system.

FIG. 8 is a block diagram representation of an RB 800 showing the RE pattern assignment to CSI-RS for the case of 8 CSI-RS ports in normal cyclic prefix (CP) subframes, for both frame structures (FS) FS 1 and FS 2.

Figure 9:
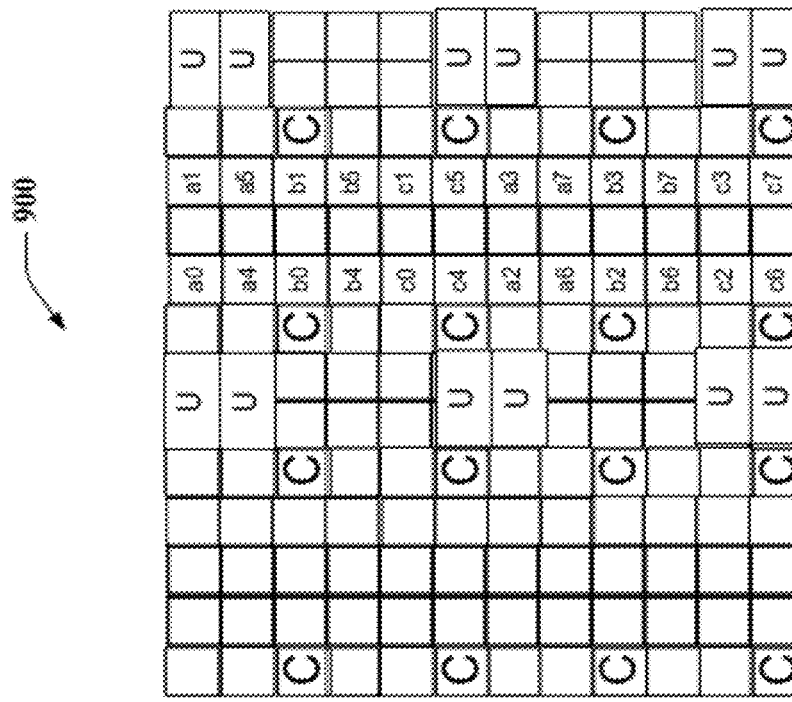
FIG. 9 is a block diagram representation of a resource block used in a wireless communication system.

FIG. 9 is a block diagram representation of an RB 900 showing an alternate RE pattern assignment to CSI-RS for the case of 4 CSI-RS ports in normal cyclic prefix (CP) subframes, for frame structure FS 2.

Figure 10:
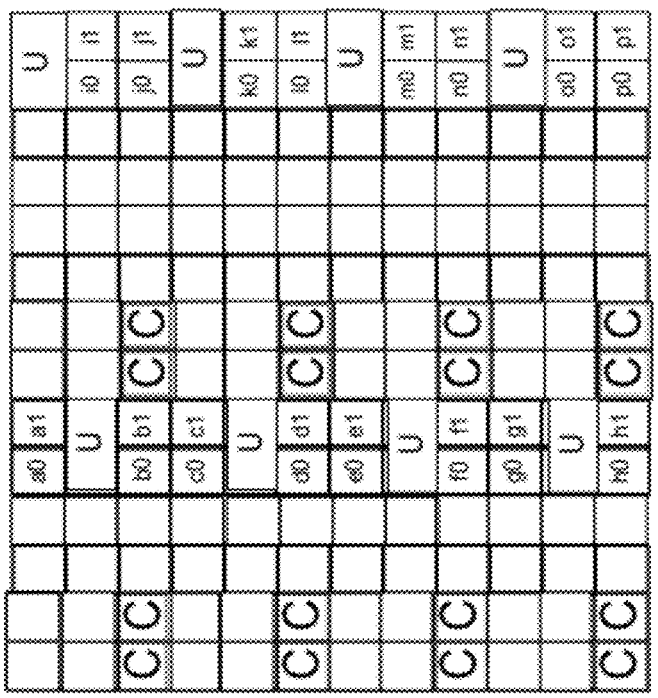
FIG. 10 is a block diagram representation of a resource block used in a wireless communication system

FIG. 10 is a block diagram representation of an RB 1000 showing a RE pattern assignment to CSI-RS for the case of 2 CSI-RS ports in extended cyclic prefix (CP) subframes, for both frame structures (FS) FS 1 and FS 2.

Figure 11:
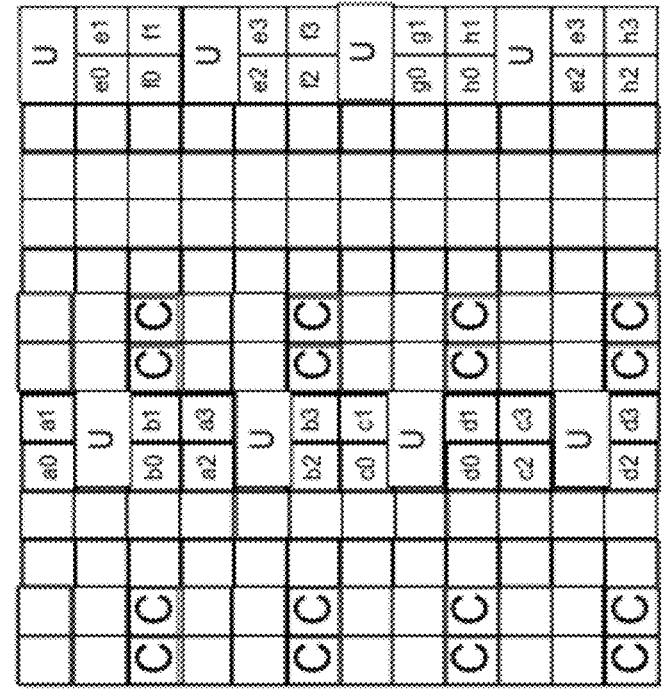
FIG. 11 is a block diagram representation of a resource block used in a wireless communication system

FIG. 11 is a block diagram representation of an RB 1100 showing the RE pattern assignment to CSI-RS for the case of 4 CSI-RS ports in extended cyclic prefix (CP) subframes, for both frame structures (FS) FS 1 and FS 2.

Figure 12:
FIG. 12 is a block diagram representation of a resource block used in a wireless communication system

FIG. 12 is a block diagram representation of an RB 1200 showing the RE pattern assignment to CSI-RS for the case of 8 CSI-RS ports in extended cyclic prefix (CP) subframes, for both frame structures (FS) FS 1 and FS 2.

Figure 13:
FIG. 13 is a block diagram representation of schemes for allocating resource element pairs to space frequency block code (SFBC) pairs.

FIG. 13 is a block diagram representation of an RB 1300 showing an alternate RE pattern assignment to CSI-RS for the case of 8 CSI-RS ports in extended cyclic prefix (CP) subframes, for frame structure FS 2.

In general, when certain data REs are assigned (or set aside) for transmission of CSI-RS, such information may or may not be known to different UEs 120. For example, legacy UEs 120 (e.g., Rel-8 UEs 120) may not be aware of CSI-RS while Release 10 UEs may be aware of the CSI-RS. In such cases, data transmissions to new UEs and legacy UEs 120 may be "rate matched" or "punctured" for compatibility.

In some designs, puncturing may be achieved by simply dropping from transmissions data that would have been transmitted in the REs now assigned to CSI-RS. A legacy receiver may be able to receive and recover transmissions using, e.g., error coding techniques. In some designs, rate matching may be achieved by skipping the REs assigned to CSI-RS, but transmitting all intended data bits intended for transmission to new UEs 120. Data may also only be punctured for UEs not aware of CSI-RS. For UEs aware of CSI-RS either rate matching or puncturing may be used but both UE and eNB need to be aware of which approach is used. Rate matching is expected to have better performance than puncturing. In some designs, available data REs may be used for data transmissions by first ordering in frequency, followed by time.

Figure 14:
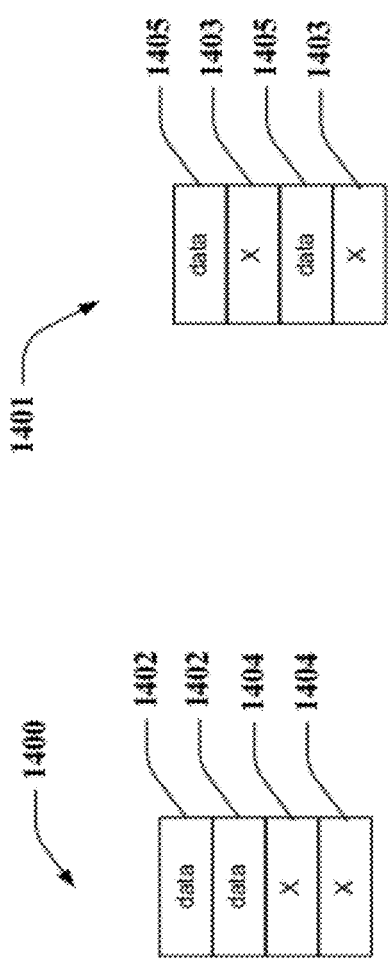
FIG. 14 is a block diagram representation of schemes for allocating resource element pairs to space frequency block code (SFBC) pairs.

Referring to FIG. 14, two possible resource allocation schemes for assigning data REs to CSI-RS transmissions in a group of four contiguous REs of a symbol are shown. It is understood that similar schemes may be used for other sizes of RE groups also. In the group 1400, a pair of neighboring REs 1404 may be assigned to CSI-RS, thereby leaving the pair of REs 1402 available for data transmission. In another scheme, in the group 1401, a first RE in the RE pair 1403 assigned to CSI-RS may come from a neighboring pair of REs and a second RE in the RE pair 1403 may come a second neighboring pair of REs. As can be seen the scheme depicted for the group 1401 results in puncturing of two data RE pairs by CSI-RS transmissions. By contrast, only one data RE pair is punctured in the group 1400, thereby allowing data transmission on RE pair 1402 using a group coding scheme (e.g., SFBC).

However, for transmit diversity schemes such as SFBC and SFBC-FSTD, when the number of available data REs within an RB in which CSI-RS transmissions have been assigned is not a multiple of 2 or 4, the use of remaining data REs may need to be carefully planned to reduce or avoid wasting data REs because the remaining REs may not be allocable to SFBC or SFBC-FSTD groups. For example, SFBC and SFBC-FSTD require RE allocation in groups of 2 and 4 REs respectively. In Table 1 below, possible combinations of CSI-RS and CRS ports that lead to such cases are listed.

Referring to Table 1, the first column indicates the number of CRS ports assumed for a particular CSI-RS assignment scenario. The second column "Transmit Diversity Scheme" lists the transmission coding technique used for data transmissions. The third column lists various possible CSI-RS antenna port assignments. The fourth column lists whether the combination of reference signal configurations in the first three columns may be used in certain designs. The fifth column lists any possible rate matching issues on a per RB basis that may arise for the data and reference signal configurations listed in the first three columns.

TABLE 1

| CRS Ports | Transmit Diversity Scheme | CSI-RS Ports | Preference on support | Rate matching issues on CSI-RS Symbols |
|---|---|---|---|---|
| 1 | Rank 1 Transmission | 2, 4, 8 | Not supported due to impact of reduced #CRS on control performance | No Issues |
| 2 | SFBC | 2 | Supported | 11 available data REs. 5 SFBC pairs + 1 orphan data RE. |
|  |  | 4 | Supported | 10 available data REs. |
|  |  | 8 | Supported | 8 available data REs. |
| 4 | SFBC-FSTD | 2 | Not Supported. Need for #CSIRS < #CRS not clear. | 11 available data REs. 2 SFBC-FSTD pairs, 3 orphan data REs. |
|  |  | 4 | Supported | 10 available data REs. 2 SFBC-FSTD pairs + 2 orphan REs. |
|  |  | 8 | Supported | 8 available data REs. |

Figure 15:
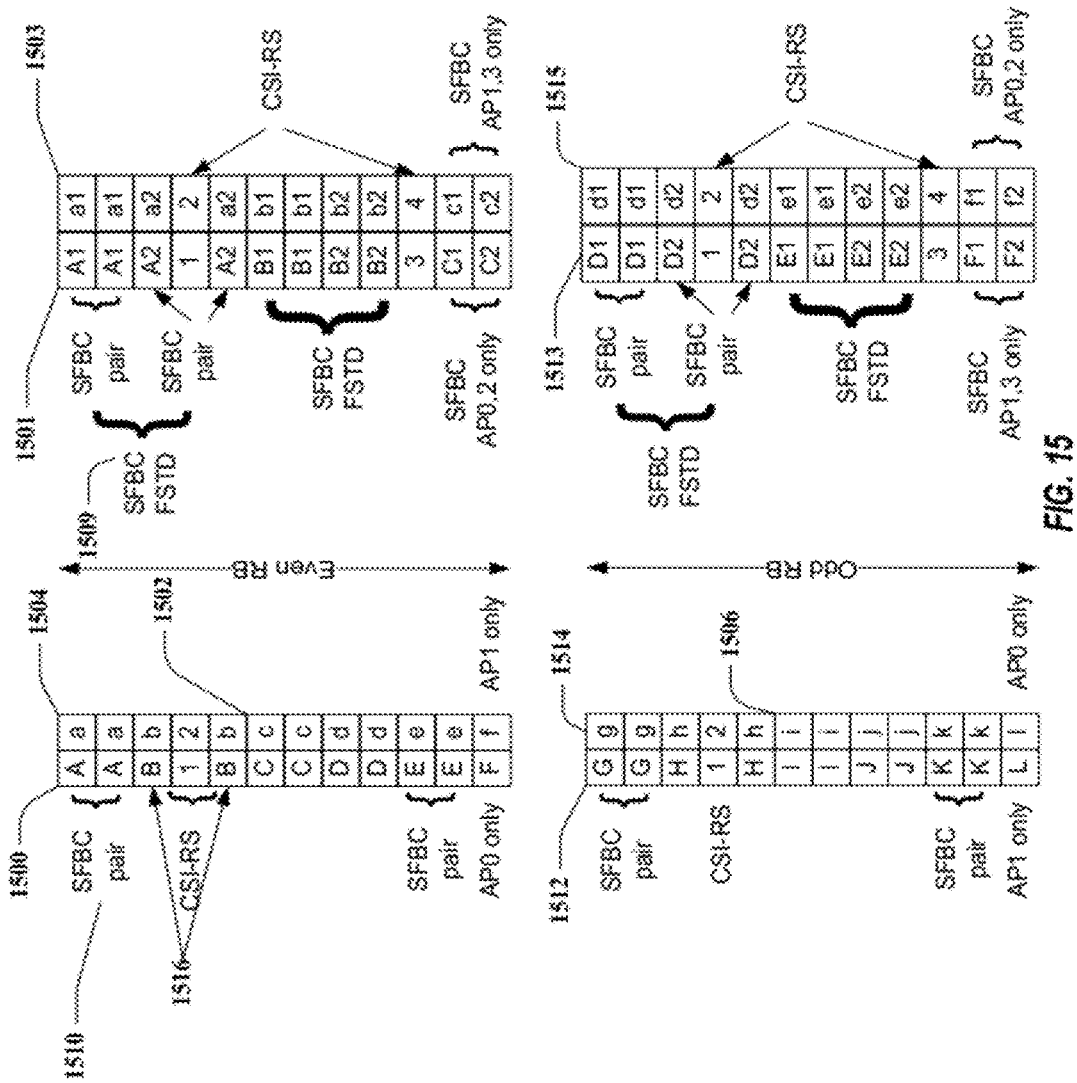
FIG. 15 is a block diagram representation of a resource pattern allocation in a wireless communication system.

Referring to FIG. 15, for symbols 1500, 1502, 1504, 1506, 1512, 1513, 1514 and 1515 containing CSI-RS there are 11 available REs. These symbols may, e.g., correspond to the symbol indices 5, 6, 9 10, 12 or 13, as depicted in FIGS. 3 to 13. The CSI-RS assignment patterns depicted in FIG. 15 highlight, among other aspects, the idea of rate matching around CSI-RS with antenna port switching across CSI-RS symbols and across RBs. In some designs, the first 10 available REs (counting from the top) may be used for 5 SFBC pairs, marked with lower case and upper case combination of alphabets A to E and G to K. For the remaining REs 1502 (marked with "F" and "f") in the neighboring symbols, (the so called orphan REs), only one modulation symbol may be transmitted and from only one CRS antenna port. As depicted, there are 2 symbols 1500, 1504 containing CSI-RS that have the orphan RE. The CRS antenna port used within an RB on the two OFDM symbols containing CSI-RS may be different. The antenna port used for the orphan REs on OFDM symbol containing CSI-RS may switch across RBs (marked as "AP 0" and "AP 1" in FIG. 15). In one aspect, this may ensure that both CRS antenna ports are used nearly equally when multiple RBs are used for the SFBC transmission.

In some designs, the following antenna port to RE mapping scheme may be used. For the first CSI-RS symbols 1500, antenna port 0 is used on even RBs (represented by symbol 1500) and antenna port 1 is used for odd RBs (symbol 1502). For second CSI-RS symbols, antenna port 0 is used on odd RBs (symbol 1506) and antenna port 1 is used on even RBs (symbol 1504). For the sake of clarity, only two symbols that contain CSI-RS REs in the RB are shown in FIG. 15.

As is depicted in FIG. 15, for each symbol that includes CSI-RS assignments, there are 11 REs available for data transmissions. The first 10 REs (from the top) may be used in 5 SFBC pairs for data transmissions. The remaining RE (orphan RE) may satisfy the following conditions: (1) on the orphan RE only one modulation symbol may be transmitted and from only one CRS antenna port; (2) there are 2 symbols containing CSI-RS that have the orphan RE; the CRS antenna port used within an RB on the two OFDM symbols containing CSI-RS are different; and (3) the antenna port used for the orphan REs on the symbol containing CSI-RS switches across RBs (even and odd). In one aspect, the switching ensures that both CRS antennal ports are used nearly equally when multiple RBs are used for the SFBC transmission.

It will be appreciated that the mapping scheme for symbols 1500, 1504, 1512 and 1514 achieves the conditions disclosed above. For 1502, antenna port 0 is used on even RBs and antenna port 1 is used for odd RBs. For second CSI-RS symbol 1504, antenna port 0 is used on odd RBs and antenna port 1 is used on even RBs. It should be noted that although the last RE in the mapping scheme for symbols 1500, 1504, 1512 and 1514 has been selected as the orphan RE, it is understood that any one of the available 11 REs may be selected as the orphan RE based on performance. Further, the particular antenna ports and even/odd RBs of the mapping scheme for symbols 1500, 1504, 1512 and 1514 may be varied as long rate matching around CSI-RS is performed with antenna port switching across CSI-RS symbols and across RBs.

Referring now to symbols 1501, 1503, 1513 and 1515, mapping schemes are illustrated for rate matching around CSI-RS with antenna port switching across CSI-RS symbols and across RBs. The mapping scheme may include rate matching around data transmissions using the SFBC-FSTD transmit diversity scheme. For symbols that do not contain CSI-RS (not depicted in FIG. 15), Rel-8 mapping scheme may be used. For symbols containing CSI-RS, e.g., symbols 1501, 1503, 1513 and 1515, there are 10 available REs. The first 8 available REs may be used to accommodate 2 SFBC-FSTD pairs. For the remaining 2 REs (orphan REs), the following mapping conditions may be satisfied: (1) on the 2 orphan REs, one uses SFBC transmission scheme using two antenna ports; (2) the CRS antenna ports used for the orphan REs within an RB on the two OFDM symbols containing CSI-RS are different. That is, if one uses antenna ports (0, 2) for the orphan REs on the first CSI-RS symbol, then one uses antenna ports (1, 3) for the orphan REs on the second CSI-RS symbol; (3) the antenna ports used for the orphan REs switch across RBs. This ensures that all 4 CRS antenna ports are used nearly equally when multiple RBs are used for the SFBC transmission. Example mappings consistent with the above conditions are depicted for symbols 1501, 1503, 1513 and 1515.

In some designs, data REs occupying the same time-frequency locations as the CSI-RS REs of neighboring cells may be muted (i.e., not used) during data transmissions in a given cell. In one aspect, the muting of such data REs may improve the effectiveness of CSI-RS channel estimation of neighboring cells, e.g., for CoMP and HetNet scenarios. In some design, from the perspective of UEs 120, muting may simply mean that the eNB 110 rate matches data transmission around muted REs and the REs may not be actually muted (i.e., unused for any transmissions) by the eNB 110.

However, a UE 120, which has no knowledge of muting and therefore attempts to receive data in the muted REs, may suffer a reduction in the receiver performance. Therefore, in one aspect, the information provided to UEs 120 regarding muting locations may be useful to the UE 120 to maintain receiver performance. In some designs, UEs 120 may be rate matched around the muted REs.

Figure 16:
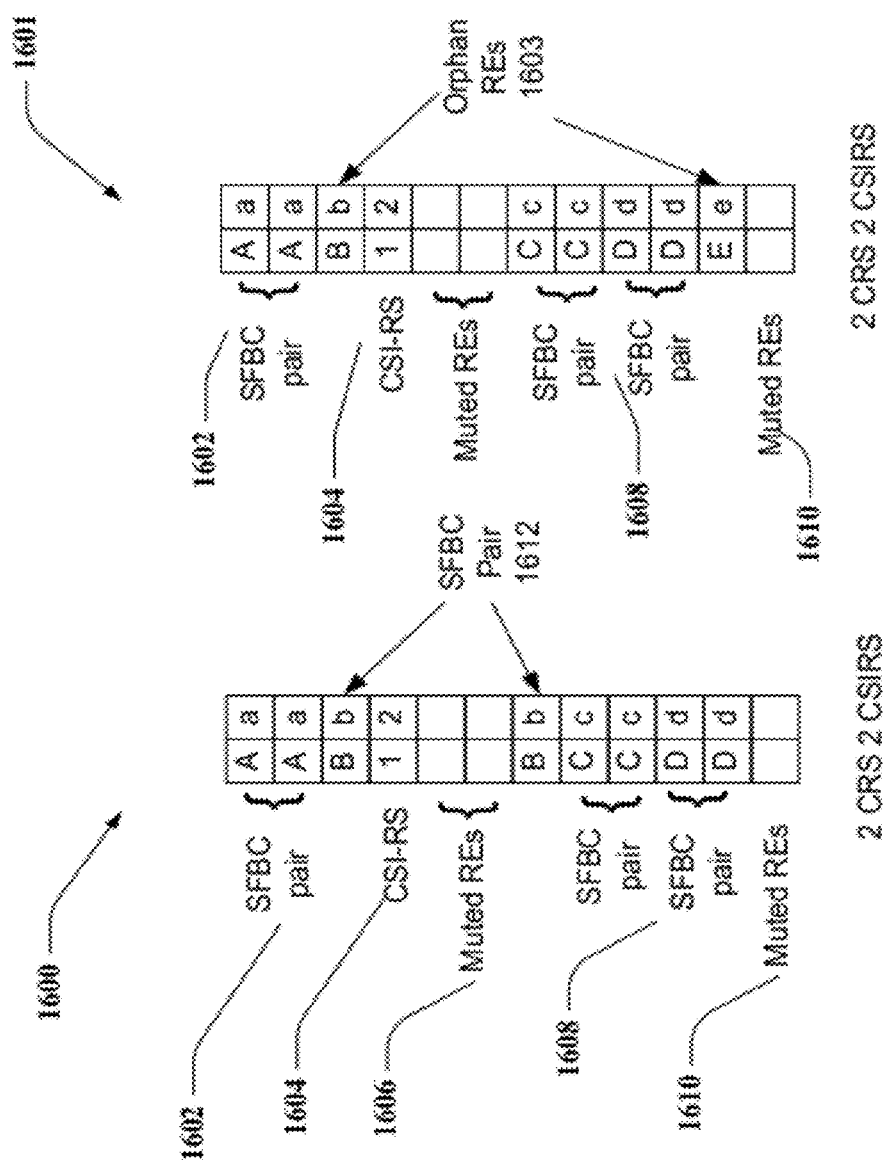
FIG. 16 is a block diagram representation of a resource pattern allocation in a wireless communication system.

FIG. 16 is a block diagram representation of a group of two symbols 1600 from an RB in which CSI-RS is transmitted. The REs include SFBC pairs 1602, 1608 and 1612 allocated for data transmissions. REs 1604 are allocated to CSI-RS transmissions in the bearer cell. REs 1606 are allocated to CSI-RS transmissions in a neighboring cell and are muted in the bearer cell. Similarly, REs 1610 are also muted in the bearer cell. It may be seen that while SFBC pairs 1602 and 1608 comprise time-frequency contiguous REs, the SFBC group 1612 is split in two parts due to the intermediate CSI-RS pattern 1604 and muted REs 1606. Using the rate matching technique described before to rate match around muted and CSI-RS tones could lead to situations where such use of SFBC over tones which are more than two tones apart may degrade the performance of the SFBC scheme.

In some designs, as depicted in the symbols 1601 in FIG. 16, the tones for which a paired RE cannot be found may be treated as orphan REs 1603. Note that such orphan REs may occur also for 2 CRS port, even if the number of available data REs is even (as shown in the group 1601). The scheme described before can then be applied to these orphan REs. That is, if there are one or more orphan REs that cannot be paired for SFBC, only one modulation symbol is transmitted on each orphan RE using only one antenna port. In some designs, the orphan REs may also be unused (i.e., no transmissions performed). The antenna port used changes across RBs. A further optimization where the antenna ports changes for different orphan REs on the same OFDM symbol within an RB can also be considered. However, the mapping complexity is increased and depends on the exact combination of CRS, CSI-RS, and muted REs. Similarly for 4CRS when the number of accommodated SFBC pairs is not a multiple of 2, the antenna ports used for the unpaired SFBC can be switched across RBs.

Figure 17:
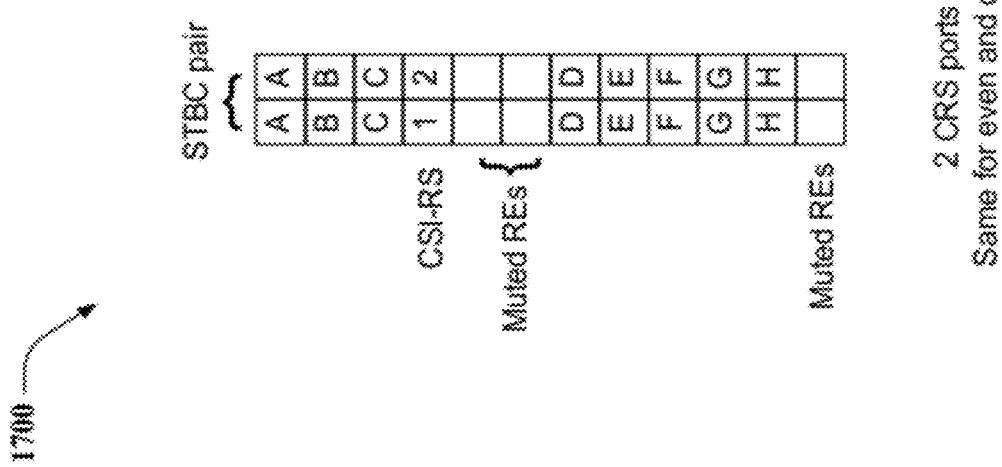
FIG. 17 is a block diagram representation of a resource pattern allocation in a wireless communication system.

Referring to FIG. 17, illustrated is an example of a mapping scheme 1700 for rate matching around CSI-RS and muted REs using space-time block coding (STBC) transmit diversity scheme. It is noted that the mapping scheme 1700 is shown only in the two symbols containing CSI-RS for the sake of simplicity and clarity. The mapping scheme 1700 is the same for even and odd RBs. The mapping scheme 1700 employs STBC for 2 CRS antenna ports on the symbols containing CSI-RS/muted REs. It is noted that SFBC may continue to be used on other symbols.

Figures 18, 19:
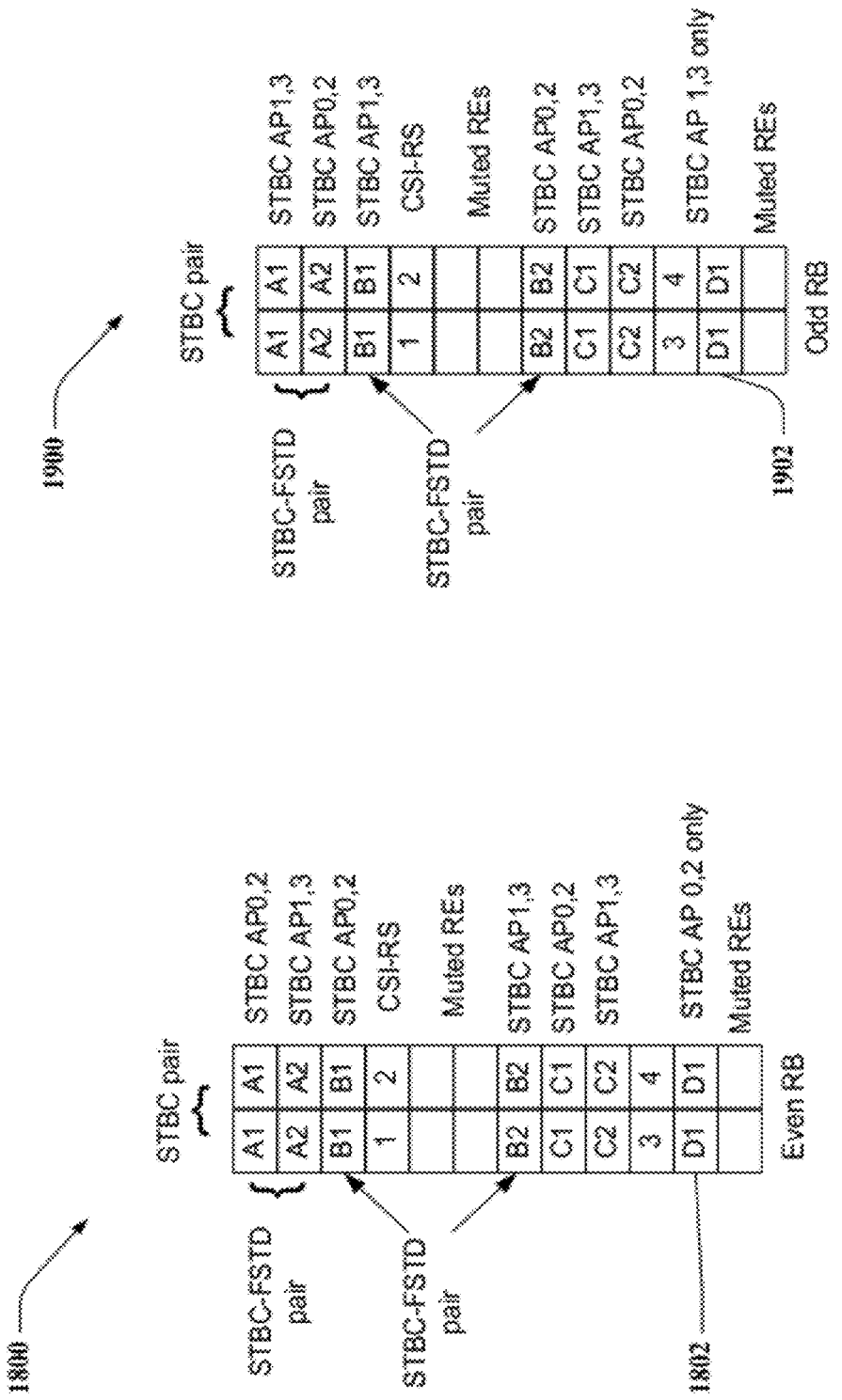
FIG. 18 is a block diagram representation of a resource pattern allocation in a wireless communication system.
FIG. 19 is a block diagram representation of a resource pattern allocation in a wireless communication system.

With reference to FIG. 18 and FIG. 19, in designs that use muting, an alternate scheme that employs STBC and STBC-FSTD for 2 and 4 CRS antenna ports respectively on the symbols containing CSI-RS or muted tones may be used. In the alternate scheme, SFBC and SFBC-FSTD may be used on other symbols that do not have any muting or CSI-RS RE assignments. For STBC-FSTD, antenna ports may be alternated between (0, 2) and (1, 3) on the available REs. In some designs, for 4 CRS antenna ports, the antenna ports used for STBC may be fixed on the first available RE of even RBs to (0, 2) and on first available RE of odd RBs to (1, 3). In one aspect, the fixed mapping may help ensure equal utilization of all antenna ports.

For example, in FIG. 18, a symbol pair 1800 (e.g., symbols 5 and 6 of RB on which CSI-RS are assigned) is shown for an even RB. After REs in a symbol are assigned to STBC-FSTD pairs, CSI-RS and muted, as described previously, the remaining RE (marked "D1") in each symbol forms an RE pair 1802, which may be assigned to antenna ports (0, 2). Similarly, the RE pair 1902 in the symbol pair 1900 may be assigned to antenna ports (1, 3).

In some designs, as previously discussed, data transmissions may be rate matched around CSI-RS and muted tones for transmit diversity schemes such as SFBC and SFBC-FSTD. In some designs where CSI-RS transmissions are performed without muting, the RE allocation to CSI-RS may result in orphan REs for two cases (a) 2 CSI-RS and 2 CRS and (b) 4 CSI-RS and 4 CRS, as previously discussed. In some designs, single antenna port transmissions may be used in the orphan REs for 2 CRS case. In some designs, SFBC transmissions may be used in the orphan REs for the 4 CRS case. The antenna ports may be switched across RBs (odd and even) and across OFDM symbols, to ensure mitigation of power imbalance and also uniform transmission resource allocation to all antenna ports.

Referring again to FIG. 16, as previously discussed, mapping schemes for two symbol pairs 1600 and 1601 are shown. It may be seen from FIG. 16 that the REs assigned to the SFBC pair "B" 1612 are three subcarriers apart. In some designs, a UE 120 may be processing the received signal corresponding to signals transmitted in these REs by assuming the same channel characteristics for all REs in a given RE group (e.g., both REs in an RE pair). Such an assumption may be made by certain conventional UEs 120, such as Rel-8 UEs 120, because typical REs assigned to a resource pair in Rel-8 are either neighboring REs or one RE away within a symbol and by other UEs 120 to simplify implementation. Therefore, in certain designs, a separated RE pair may result in a reduced performance for UEs 120 that assume the same channel characteristics for both REs in an RE pair. The term "separated RE pair" refers to RE pairs in which constituent REs are greater than one RE apart. For example, the two "B" REs in FIG. 16 have a three RE separation and would therefore be considered to be a "separated RE pair."

Certain designs may overcome the possible performance impairment due to receiving separated REs, in one aspect, by using techniques for RE pair allocation in which available REs in a symbol are allocated to minimize the separation between REs in an RE pair. For example, in some designs, RE allocation may be performed by traversing the available REs in a given symbol, e.g., from top to bottom of the graphical representation 1600 or 1601, and assigning REs to RE pairs using a technique, e.g., as described by the pseudo-code listed in Table 2. It will be noted that the pseudo-code listing in Table 2 is for RE assignment within a given RB of 12 REs. As noted further below, a similar assignment may be performed for resource assignment chunks that include multiple RBs (i.e., multiple 12 RE groups assigned to a single UE).

TABLE 2

```
N=1;
While (N<12)
{
if N and N+1 are data REs, then {
    make N and N+1 an SFBC pair;
    N=N+2;
    }
else if (N<=10 and N and N+2 are data REs) then {
    make N and N+2 an SFBC pair;
    N=N+3;
    }
else N = N+1; // this corresponds to data RE N not being used/ RE N not being data RE.
}
```

As can be seen by the listing in Table 2, RE assignment according to the code listing will result in RE pairs in which constituent REs are no greater than a single subcarrier apart within a symbol.

Referring now to FIG. 20, an example RE assignment 2000, when multiple consecutive RBs are used for transmissions to a given UE 120, is depicted. It will be appreciated by one of skill in the art that the Table 2 pseudo-code may be modified in such a case to execute over the appropriate upper threshold for N (e.g., N<24, when two RBs are used for a given UE 120). Furthermore, as can be seen from FIG. 20, the use of consecutive RBs may result in a reduced number of ungrouped (or orphan) REs. For example, while REs marked "E" and "e" in the symbol pair 1601 were ungrouped, the corresponding REs in FIG. 20 are paired and assigned in the RE assignment 2000, thereby reducing the number of ungrouped REs.

A similar RE assignment technique may be used for 4 CRS ports which uses SFBC-FSTD. In such a case, if the number of SFBC pairs found available within an RB is odd, then the last SFBC pair may also be skipped. Alternately, if the number of SFBC pairs found on an OFDM symbol is odd, the last SFBC pair may be skipped. This will ensure that the number of SFBC pairs are even which in turn ensures that all 4 CRS ports are used equally.

Alternatively, in some designs, RE pairs may not be formed across RBs (e.g., REs such as "E" and "e" in symbol pair 1601 may be left ungrouped even when it may be possible to pair them up with nearby REs from another resource block).

In some designs, where frequency domain duplexed (FDD) transmission is used, CSI-RS may not be allocated in subframes that include PBCH and Sync signals In some designs, paging subframes may be excluded from CSI-RS RE allocation. For example, this may result in no CSI-RS signals being sent on subframe indices 0, 4, 5 and 9 in a transmission frame structure.

In designs where CSI-RS is omitted on such subframes, REs may still be allocated so that relay access and backhaul partitioning may be performed by taking into account the omission of CSI-RS signals from, e.g., subframes 0, 4, 5 and 9.

When time domain duplexing (TDD) is used on a wireless channel, in some designs, PBCH may be on subframe index 0. In the first 4 symbols of slot 1 of transmission, two symbols may include reference signal transmission and two may not. In some designs, primary synchronization signal (PSS) may be transmitted on the third OFDM symbol in subframe 1 and 6. Similarly, secondary synchronization signal (SSS) may be transmitted on the last OFDM Symbol in subframe 0 and 5. In some designs, these symbols may be excluded from CSI-RS transmissions. As a result of the exclusion of REs as above, 30 CSI-RS REs may be available on subframes with PBCH and SSS and 54 CSI-RS REs may be available on subframe 5 with just SSS. In some designs, alternate subframe 5 contains SIB1 and CSI-RS allocation may avoid such subframes also.

Table 3 summarizes a different uplink-downlink configuration modes (column 1) and switch point periodicity for each mode (column 2) with allocation of each subframe for the given configuration to uplink transmissions ("U"), downlink transmissions ("D") and synchronization signals ("S").

TABLE 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In some designs, the eNB 110 may perform paging operation based on a paging configuration as follows: In FDD, select paging to be on subframes: {9} or {4, 9} or {0, 4, 5, 9}, repeated periodically. In TDD, performing paging on subframes {0}, {0, 5}, {0, 1, 5, 6}, periodically. In Config 0, only 3 DL OFDM symbols on special subframes may be available, and therefore CSI-RS may not be performed on these symbols.

In some designs, therefore the bandwidth covered by CSI-RS transmission may be split into multiple groups (e.g. two groups). For example, on Subframe 0, 50% of the bandwidth may be covered by CSI-RS transmission and on subframe 5 the remaining 50% bandwidth may be covered by CSI-RS transmissions. In some designs, data transmissions to UEs 120 that are aware of CSI-RS transmissions, may be performed outside of these subframes. In some designs, CSI-RS may not be supported for Config 0.

In wireless systems comprising multiple cells, CSI-RS transmissions may be allocated REs in multiple subframes. In one aspect, the allocation of CSI-RS REs across multiple subframes may provide better reuse of the same resources in neighboring cells. In one aspect, using multiple subframes may enable subframe partitioning in HetNet configurations.

The allocation of CSI-RS across multiple subframes may also help with the use of CSI-RS in relay operations. For example, a relay node may transmit CSI-RS on DL access subframes and may needs to listen to CSI-RS from macro on DL backhaul. By utilizing multiple subframes, a relay node may not have to transmit and receive CSI-RS on the same subframe, thereby reducing the complexity burden on relay design.

In various designs, the partitioning of subframes may not necessarily split subframes with the periodicity of a frame (e.g., 10 ms). For flexibility, RE patterns for CSI-RS may be defined and the information may be conveyed from the eNB 110 to UEs 120 using bitmaps. The use of bitmaps may also allow for future compatibility with other RE allocations. For example, in some designs, unequally spaced (or aperiodic) subframes may be allocated to reference signal transmissions, with the pattern of subframes repeated over a subframe period. As a non-limiting example, subframes 0, 5 and 20 may be allocated in a given sequence of subframes over a 40 millisecond period, with the pattern being repeated every 40 milliseconds. Correspondingly, the aperiodic subframe pattern may be conveyed to UEs 120 using a downlink message and UEs 120 may be configured to receive the aperiodic (or unevenly spaced) transmission pattern, which has a period of repetition.

In some designs, the REs allocated to CSI-RS transmissions, e.g., to a particular antenna port, may be hopped over a period of time. In one aspect, hopping may enable UEs 120 to receive at least a few CSI-RS without being affected by a strong interfering neighboring cell transmission. In some designs, a different hopping pattern may be used for each antenna port. Alternatively, in some designs, hopping may be defined for a group of antenna ports (i.e., transmissions for all antenna ports in the group collide or do not collide). The latter alternative may work better if a UE 120 could figure out when the CSI-RS collide and does not use the CQI in that case. In the former alternative, the chances of a few antenna ports colliding may be larger, causing reported CQI/PMI to be erroneous more often.

In some designs, muting pattern may be selected based on a power class of the bearer network. For example, in some designs, an eNB 110 for a macro cell may mute CSI-RS locations of all picos. In some designs, an eNB 110 for a femto cell may mute the CSI-RS location of all macros and picos. In some designs, the muting pattern may be changed, based on feedback from the UE 120.

FIG. 21 is a flow chart representation of a process 2100 for wireless communication. At box 2102, a plurality of available data resource elements (REs) in a subframe are identified. The available data REs may comprise, for example, REs that are assigned to either CSI-RS transmission or REs that are muted for corresponding CSI-RS transmissions in other cells. The available REs may include, for example, REs assigned to SFBC pairs or SFBC-FSTD pairs as depicted in FIG. 15. At box 2104, REs from the plurality of available data REs are assigned for data transmission to a wireless device in groups of a predetermined number of REs such that all assigned data REs within a group are within a predetermined number of symbols of each other in time domain and within a second predetermined number of subcarriers of each other in frequency domain, thereby resulting in one or more ungrouped REs. For example, as depicted in FIGS. 15 to 20, the REs not assigned to CSI-RS and/or not muted may be grouped into RE groups on the same symbol or RE groups on the neighboring symbols. In some designs, REs from two symbols away may be grouped also (e.g., symbols 5, 6, 9 and 10 in an RB in which CSI-RS are allocated). In some designs, REs that are one or two subcarrier indices away may be grouped in a single data transmission group (e.g., RE pair 1516 in FIG. 15).

In some designs, some REs may be left over after the remaining REs are assigned to CSI-RS and data transmissions (e.g., the RE marked "F" in symbol 1500). In some designs, the remaining REs may be assigned to other transmission to other wireless devices (e.g., data transmission to another UE 120). In some designs, the remaining REs may be left unused (i.e., no transmissions performed).

In some designs, the grouping of REs may be limited to REs within the same resource block. For example, the same RE assignment pattern (e.g., as depicted in FIGS. 15 to 17)

may be repeated in each RB in which reference signal transmissions are assigned. It will also be appreciated that the various RE assignment patterns discussed above may be a function of a number of transmit antenna ports used for another reference signal (e.g., CRS).

In some designs, the data transmission assignments to REs within the group of REs may comprise space-frequency block code (SFBC) and space-time block code pairs. In some designs, the data transmissions within the group of REs may comprise a transmit diversity scheme. The transmit diversity scheme may be, for example, an Alamouti scheme.

In some designs, the at least one ungrouped RE may be used for transmission to the same device to which the data transmissions are sent. However, the transmission scheme used may be different. For example, while SFBC pairing may be used for REs in the transmission group, another transmission scheme (e.g., single antenna port transmission) may be used for the ungrouped REs.

FIG. 22 is a block diagram representation of a portion 2200 of a wireless communication apparatus. The module 2202 is for identifying a plurality of available data resource elements (REs) in a subframe. The module 2204 is for assigning REs from the plurality of available data REs for data transmission to a wireless device in groups of a predetermined number of REs such that all assigned data REs within a group are within a predetermined number of symbols of each other in time domain and within a second predetermined number of subcarriers of each other in frequency domain, thereby resulting in at least one ungrouped REs. In some designs, an identifier may be used for assigning from the available data resource REs and an assigner may be used for assigning REs from the plurality of remaining data REs.

FIG. 23 is a flow chart representation of a process 2300 for wireless communication. At box 2302, resource elements (REs) of a symbol are assigned to a reference signal transmission. At box 2304, at least some of remaining REs of the symbol are muted, thereby refraining from transmitting data on the muted REs. At box 2306, the reference signal is transmitted by boosting a transmitted power of the reference signal. As previously described, in some designs, the muted REs may comprise transmissions resources (e.g., RE locations) used for transmission of the reference signal in another neighboring cell (e.g., CSI-RS).

FIG. 24 is a block diagram representation of a portion 2400 of a wireless communication apparatus. The module 2402 is for assigning, resource elements (REs) of a symbol to a reference signal transmission. The module 2404 is for muting at least some of remaining REs of the symbol, thereby refraining from transmitting data on the muted REs. The module 2406 is for transmitting the reference signal by boosting a transmitted power of the reference signal. In some designs, the REs may be assigned by an assigner, the muting may be performed by a processor and a transmitter may be used to transmit the reference signal.

FIG. 25 is a flow chart representation of a process 2500 for wireless communication. At box 2502, an aperiodic transmission resource pattern is assigned to a reference signal having a periodicity of multiple subframes. At box 2504, the reference signal is transmitted according to the aperiodic transmission resource pattern. In some designs, the aperiodic transmission resource may be signaled to UEs 120 using a downlink message. In some designs, the downlink message may comprise a bitmap indicating REs used for the transmission of the reference signal. As previously discussed, the aperiodic transmissions may be allocated such that a relay node may not have to receive and transmit the reference signal in the same subframe of transmission. In some designs, the aperiodic transmission resource pattern may include non-equally (or aperiodically) spaced subframes, e.g., subframes 0, 5, 20, in a given number of subframes (e.g., over 40 milliseconds) and the aperiodic or unequally spaced subframe pattern may be repeated.

FIG. 26 is a block diagram representation of a portion 2600 of a wireless communication apparatus. The module 2602 is for assigning an aperiodic transmission resource pattern to a reference signal having a periodicity of multiple subframes. The module 2604 is for transmitting the reference signal according to the aperiodic transmission resource pattern.

FIG. 27 is a flow chart representation of a process 2700 for wireless communication. At box 2702, resources are allocated to a transmitter of the reference signal depending on a power class of the transmitter. At box 2704, using the allocated resources, transmission of the reference signal from the transmitter is performed. As previously discussed, the power class may be one of a macro, a pico and a femto class. In one aspect, the power class based assignment of transmission resources may help avoid interference of macro cells with pico or femto cells and of femto base stations with other femto/pico/macro base stations.

FIG. 28 is a block diagram representation of a portion 2800 of a wireless communication apparatus. The module 2802 is for allocating resources to a transmitter of the reference signal depending on a power class of the transmitter. The module 2804 is for performing, using the allocated resources, transmission of the reference signal from the transmitter. In some designs, an allocator may be provided for allocating the resources to a transmitter.

FIG. 29 is a flow chart representation of a process 2900 for wireless communication. At box 2902, from a set of all available transmission resources for a reference signal, a subframe-dependent pattern of transmission resources is assigned to the reference signal in a given subframe. At box 2904, the allocated subframe-dependent pattern is varied over a plurality of subframes such that all available transmission resources from the set are used at least once. The subframe-dependent pattern in the given subframe is non-overlapping with transmission resources allocated to a first signal and a second signal. At least in one subframe from the plurality of subframe, at least one transmission resource from the set is allocated to the first signal instead of the reference signal. In some designs, the first signal may be the PBCH or SSS and the second signal may be a paging signal or SIB.

FIG. 30 is a block diagram representation of a portion 3000 of a wireless communication apparatus. The module 3002 is for allocating, from a set of all available transmission resources for a reference signal, a subframe-dependent pattern of transmission resources to the reference signal in a given subframe. The module 3004 is for varying the allocated subframe-dependent pattern over a plurality of subframes such that all available transmission resources from the set are used at least once. The subframe-dependent pattern in the given subframe is non-overlapping with transmission resources allocated to a first signal and a second signal. Furthermore, at least in one subframe from the plurality of subframe, at least one transmission resource from the set is allocated to the first signal instead of the reference signal.

FIG. 31 is a flow chart representation of a process 3100 for wireless communication. At box 3102, a plurality of available data resource elements (REs) in a subframe are identified. At box 3104, the plurality of available data REs are assigned to data transmission in at least one space frequency block coding (SFBC) group and at least one space time block coding (STBC) group, thereby resulting in no ungrouped REs.

FIG. 32 is a block diagram representation of a portion 3200 of a wireless communication apparatus. The module 3202 is for identifying a plurality of available data resource elements (REs) in a subframe. The module 3204 is for assigning the plurality of available data REs to data transmission in at least one space frequency block coding (SFBC) group and at least one space time block coding (STBC) group, thereby resulting in no unused REs.

FIG. 33 is a flow chart representation of a process 3300 for wireless communication. At box 3302, a reference signal in a subframe from REs assigned to transmissions of the reference signal is received. The subframe comprises a plurality of remaining data REs. At box 3304, data from at least one of the plurality of remaining data REs is received. The data is transmitted in groups of a predetermined number of REs such that all assigned data REs within a group are within a predetermined number of symbols in time and a second predetermined number of REs in frequency of each other, thereby resulting in at leas one ungrouped RE in the subframe (e.g., as depicted in FIG. 15).

In some designs, the reference signal is the CSI-RS. In some designs, the data received from the plurality of remaining data REs may be modulated as space-frequency block code (SFBC) and space-time block code pairs. In some designs, the data transmissions within the group of REs may be performed using a transmit diversity scheme such as an Alamouti scheme.

FIG. 34 is a block diagram representation of a portion 3400 of a wireless communication apparatus. The module 3402 is for receiving a reference signal in a subframe from REs assigned to transmissions of the reference signal, wherein the subframe comprises a plurality of remaining data REs. The module 3404 is for receiving data from at least one of the plurality of remaining data REs, wherein the data is transmitted in groups of a predetermined number of REs such that all assigned data REs within a group are within a predetermined number of symbols in time and a second predetermined number of REs in frequency of each other, thereby resulting in at least one ungrouped RE in the subframe.

Figures 35, 36:
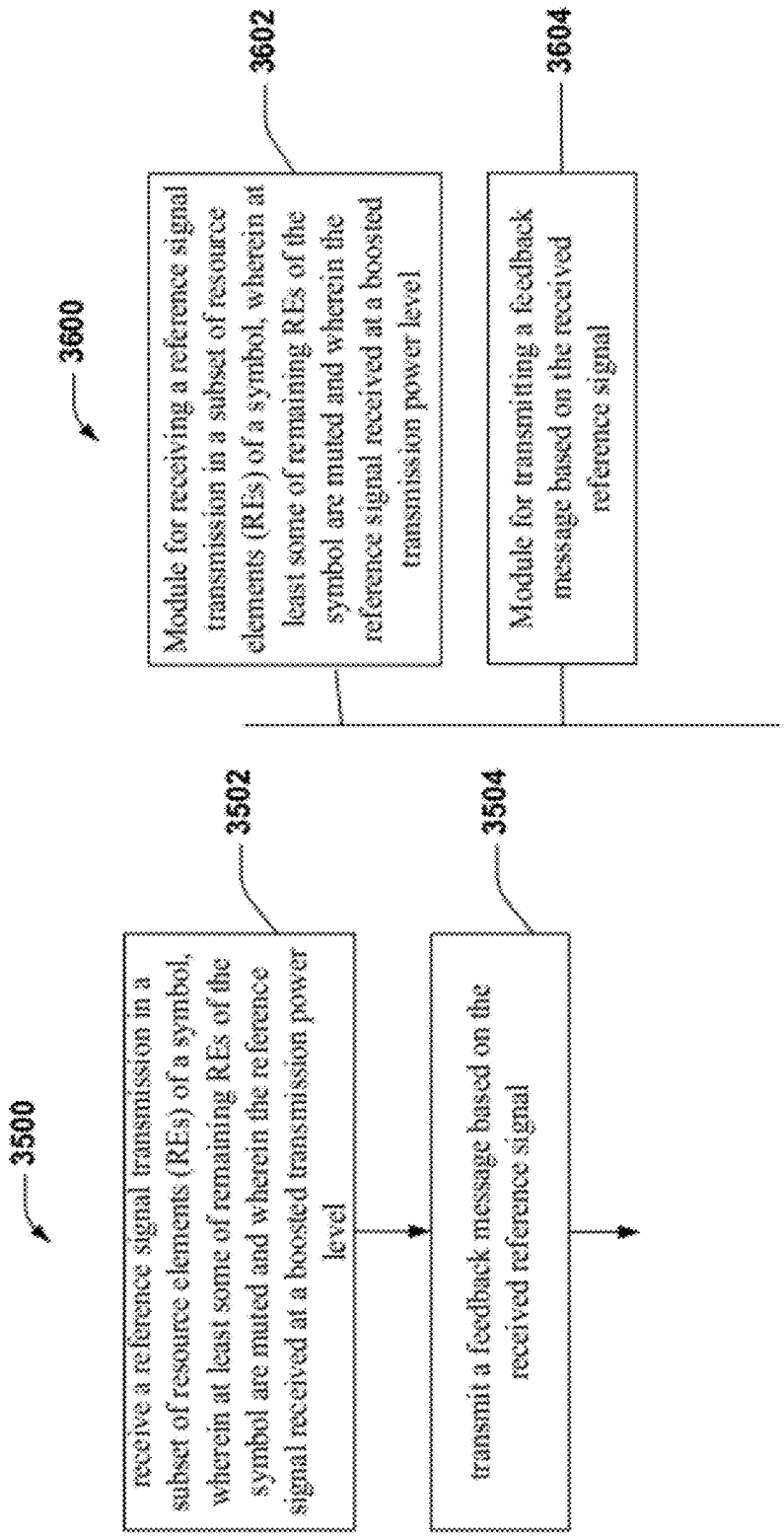
FIG. 35 is a flow chart representation of a process for wireless communication.
FIG. 36 is a block diagram representation of a portion of a wireless communication apparatus.

FIG. 35 is a flow chart representation of a process 3500 for wireless communication. At box 3502, a reference signal transmission in a subset of resource elements (REs) of a symbol is received, wherein at least some of remaining REs of the symbol are muted and wherein the reference signal received at a boosted transmission power level. At module 3504, a feedback message is transmitted based on the received reference signal.

FIG. 36 is a block diagram representation of a portion 3600 of a wireless communication apparatus. The module 3602 is for receiving a reference signal transmission in a subset of resource elements (REs) of a symbol, wherein at least some of remaining REs of the symbol are muted and wherein the reference signal received at a boosted transmission power level. The module 3604 is for transmitting a feedback message based on the received reference signal.

FIG. 37 is a flow chart representation of a process 3700 for wireless communication. At box 3702, information about an aperiodic transmission resource pattern assigned to a reference signal is received. The aperiodic transmission resource pattern has a periodicity of multiple subframes. At box 3704, the reference signal is received according to the aperiodic transmission resource pattern.

FIG. 38 is a block diagram representation of a portion 3800 of a wireless communication apparatus. The module 3802 is for receiving information about an aperiodic transmission resource pattern assigned to a reference signal, the aperiodic transmission resource pattern having a periodicity of multiple subframes. The module 3804 is for receiving the reference signal according to the aperiodic transmission resource pattern.

FIG. 39 is a flow chart representation of a process 3900 of wireless communication. At box 3902, a subframe-dependent pattern of transmission resources assigned to a reference signal, wherein the subframe-dependent pattern is varied over a plurality of subframes such that all available transmission resources are used at least once, is received. At box 3904, a control signal in a subframe at a transmission resource allocated to the reference signal in another subframe in the plurality of subframes, is received. As previously discussed, certain subframes may avoid transmission of reference signals when other control signals or paging signals are used in certain subframes. However, in other subframes, REs may be allocated to reference signal transmissions to ensure that a channel is uniformly sounded.

FIG. 40 is a block diagram representation of a portion 4000 of a wireless communication apparatus. The module 4002 is for receiving a subframe-dependent pattern of transmission resources assigned to a reference signal, wherein the subframe-dependent pattern is varied over a plurality of subframes such that all available transmission resources are used at least once. The module 4004 is for receiving a control signal in a subframe at a transmission resource allocated to the reference signal in another subframe in the plurality of subframes.

FIG. 41 is a flow chart representation of a process 4100 for wireless communication. At box 4102, a reference signal in a subset of resource elements (REs) in a subframe is received. At box 4104, at least one data transmission comprising a space time block coding (STBC) group, is received in an RE not in the subset of REs of the subframe.

FIG. 42 is a block diagram representation of a portion 4200 of a wireless communication apparatus. The module 4202 is for receiving a reference signal in a subset of resource elements (REs) in a subframe. The module 4204 is for receiving at least one data transmission comprising a space time block coding (STBC) group, in an RE not in the subset of REs of the subframe.

FIG. 43 is a flow chart representation of a process 4300 of wireless communication. At box 4302, a set of available resource elements in a resource block of a subframe is identified, wherein resource elements in the set of available resource elements can be utilized for channel state information reference signal (CSI-RS) symbols. At box 4304, a subset of the set of available resource elements is selected, wherein the subset includes sufficient resource elements to accommodate a maximum supported number of transmit antennas. At box 4306, the subset is utilized to transmit one or more CSI-RS symbols to a user equipment.

FIG. 44 is a block diagram representation of a portion 4400 of an apparatus for wireless communication. The module 4402 is for identifying a set of available resource elements in a resource block of a subframe, wherein resource elements in the set of available resource elements can be utilized for channel state information reference signal (CSI-RS) symbols. The module 4404 is for selecting a subset of the set of available resource elements, wherein the subset includes sufficient resource elements to accommodate a maximum supported number of transmit antennas. The module 4406 is for utilizing the subset to transmit one or more CSI-RS symbols to a user equipment.

FIG. 45 is a flow chart representation of a process 4300 of wireless communication. At box 4502, resources are allocated as a function of a number of transmit antennas used for transmission of the reference signal, the function being nested with respect to the number of transmit antennas such that a first resource pattern corresponding to a first number of transmit antennas is a superset of a second resource pattern corresponding a to a second number of transmit antennas when the first number is greater than the second number. At box 4504, the allocated resources are indicated in an allocation message. As previously described, in some designs, the nested allocation methodology may be used for allocating CSI-RS transmissions to antenna ports. For example, in some designs, REs may be allocated to 8 antenna ports, which are dividable into two non-overlapping group of RES allocated to 4 Tx antenna ports, which in turn are dividable into 2 each 2Tx antenna port CSI-RS transmissions. As previously discussed with respect to FIGS. 3 to 12, the resource pattern allocated to reference signal transmissions may be non-overlapping with other pre-allocated resource patterns such as CRS and UE-RS transmissions.

FIG. 46 is a block diagram representation of a portion 4600 of an apparatus for wireless communication. The module 4602 is provided for allocating resources as a function of a number of transmit antennas used for transmission of the reference signal, the function being nested with respect to the number of transmit antennas such that a first resource pattern corresponding to a first number of transmit antennas is a superset of a second resource pattern corresponding a to a second number of transmit antennas when the first number is greater than the second number. The module 4604 is provided for indicating the allocated resources in an allocation message. The allocation message may be a higher layer message and may be in the form of a bitmap specifying REs allocated in a subframe.

It will be appreciated that several new techniques for allocation of transmission resources to a reference signal are disclosed. In one aspect, the new techniques may be applied to the channel state information reference signal in LTE Rel-10.

It will further be appreciated that the various designs described above avoid having SFBC pairs separated by several tones in frequency. Some designs use STBC in combination with SFBC. Some designs introduce blank REs. Some designs use SFBC/single antenna port transmission using a pre-determined transmission scheme (beam) on some REs while using regular SFBC/SFBC-FSTD on others. For example, in some designs, CRS ports may be used and may be changed across RBs to ensure all CRS ports are used equally to achieve better power balancing.

It will also be appreciated that, in one aspect, resource elements from a resource block are assigned to certain other reference signals and mandatory transmissions. Of the remaining REs, which were available for data transmissions in legacy systems (e.g., Rel-8 and Rel-9), REs are assigned to reference signal transmissions. In one aspect, data REs are assigned to the reference signal such that the remaining data REs may be allocated to data transmissions using a modulation technique such as SFBC coding, whereby at least one ungrouped RE results within a symbol in which REs are assigned to the reference signal.

In some disclosed designs, data REs in a cell are muted at location used for reference signal transmissions in other cells. In one aspect, due to muting in other cells, a transmitted reference signal in a given cell suffers less interference, thereby resulting in a more effective calibration of channel characteristics.

In some disclosed designs, the pattern of REs assigned to a reference signal is periodic over a certain number of subframes. The periodicity may be useful in boosting the power of transmitted reference signal.

In some designs, STBC and STBC-FSTD may be used on the symbols containing CSI-RS and muted tones by avoiding using the SFBC scheme over tones that are separated by two or more tones in frequency. In one aspect, this may result in nearly equal utilization of all CRS antenna ports, and may work for all combinations of CRS, CSI-RS, and muting patterns.

In some disclosed designs, a pattern of REs is allocated to the transmission of a reference signal, from all possible REs available for the transmission of the reference signal, based on a power class of the transmitting base station. In one aspect, the allocation based on power class may be performed so that REs allocated to transmitters in different power class are mutually orthogonal in time, frequency or code domain. The orthogonalization may help with cooperative co-existence of macro, pico and femto networks.

It will further be appreciated that, in some disclosed designs, REs are allocated to the transmission of a reference signal in a subframe-dependent pattern, such that all possible REs are allocated over a number of subframes, thereby providing a substantially uniform coverage of the entire bandwidth of the transmission channel.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean serving as an example, instance, or illustration. Any aspect or design described herein as "exemplary" is not necessarily to be construed as preferred or advantageous over other aspects or designs.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein (e.g., identifiers, assigners, transmitters and allocators), may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of wireless communication, comprising:
   identifying a plurality of resource elements (REs) available for transmitting reference signals in at least one resource block (RB) of a subframe, a first set of REs from the plurality of REs being assigned to transmit reference signals and a second set of REs from the plurality of REs being assigned to transmit data, the first set of REs being different from the second set of REs; and
   assigning REs from the second set of REs to a wireless device in groups of a predetermined number of REs such that all assigned data REs within a group are within a same orthogonal frequency-division multiplexing (OFDM) symbol of a plurality of OFDM symbols of the at least one resource block and each data RE of the group being less than three resource elements away from another data RE of the group, each group of the predetermined number of REs corresponding to a data transmission from a group of antenna ports associated with a transmit diversity scheme.

2. The method of claim 1, wherein the second set of REs comprise data REs not assigned to a channel state information reference signal (CSI-RS) RE or a muted CSI-RS RE.

3. The method of claim 1, further comprising assigning at least one ungrouped RE to other transmissions to other wireless devices.

4. The method of claim 1, further comprising using at least one ungrouped RE for a non-data transmission to the wireless device.

5. The method of claim 1, further comprising refraining from using at least one ungrouped RE for any transmissions.

6. The method of claim 1 wherein the grouping is limited to REs within the same resource block.

7. The method of claim 6, further comprising muting CSI-RS transmissions at a pre-determined muting pattern.

8. The method of claim 1, wherein the predetermined number of REs is a function of a number of transmit antenna ports used for transmission of another reference signal.

9. The method of claim 8, wherein the another reference signal comprises a common reference signal (CRS).

10. The method of claim 1, wherein the groups of the predetermined number of REs comprise space-frequency block code (SFBC) or space-time block code pairs transmitted using an Alamouti transmit diversity scheme.

11. The method of claim 1, further comprising using at least one ungrouped RE for transmission to the wireless device using a transmission scheme different from that used for the data transmissions to the wireless device on the grouped REs.

12. A wireless communication apparatus, comprising:
    means for identifying a plurality of resource elements (REs) available for transmitting reference signals in at least one resource block (RB) of a subframe, a first set of REs from the plurality of REs being assigned to transmit reference signals and a second set of REs from the plurality of REs being assigned to transmit data, the first set of REs being different from the second set of REs; and
    means for assigning REs from the second set of REs to a wireless device in groups of a predetermined number of REs such that all assigned data REs within a group are within a same orthogonal frequency-division multiplexing (OFDM) symbol of a plurality of OFDM symbols of the at least one resource block and each data RE of the group being less than three resource elements away from another data RE of the group, each group of the predetermined number of REs corresponding to a data transmission from a group of antenna ports associated with a transmit diversity scheme.

13. The apparatus of claim 12, wherein the second set of REs comprise data REs not assigned to a channel state information reference signal (CSI-RS) RE or a muted CSI-RS RE.

14. The apparatus of claim 12, further comprising means for assigning at least one ungrouped RE to other transmissions from other wireless devices.

15. The apparatus of claim 12, further comprising means for using at least one ungrouped RE for a non-data transmission to the wireless device.

16. The apparatus of claim 12, further comprising means for refraining from using at least one ungrouped RE for any transmissions.

17. The apparatus of claim 12 wherein the grouping is limited to REs within the same resource block.

18. The apparatus of claim 17, further comprising means for muting CSI-RS transmissions at a pre-determined muting pattern.

19. The apparatus of claim 12, wherein the predetermined number of REs is a function of a number of transmit antenna ports used for transmission of another reference signal.

20. The apparatus of claim 19, wherein the another reference signal comprises a common reference signal (CRS).

21. The apparatus of claim 12, wherein the groups of the predetermined number of REs comprise space-frequency block code (SFBC) or space-time block code pairs transmitted using an Alamouti transmit diversity scheme.

22. The apparatus of claim 12, further comprising means for using at least one ungrouped RE for transmission to the wireless device using a transmission scheme different from that used for the data transmissions to the wireless device on the grouped REs.

23. A non-transitory computer-readable medium having computer-executable instructions stored thereon, said instructions comprising code for:
identifying a plurality of resource elements (REs) available for transmitting reference signals in at least one resource block (RB) of a subframe, a first set of REs from the plurality of REs being assigned to transmit reference signals and a second set of REs from the plurality of REs being assigned to transmit data, the first set of REs being different from the second set of REs; and
assigning REs from the second set of REs to a wireless device in groups of a predetermined number of REs such that all assigned data REs within a group are within a same orthogonal frequency-division multiplexing (OFDM) symbol of a plurality of OFDM symbols of the at least one resource block and each data RE of the group being less than three resource elements away from another data RE of the group, each group of the predetermined number of REs corresponding to a data transmission from a group of antenna ports associated with a transmit diversity scheme.

24. An apparatus for wireless communication, comprising:
a processor configured to:
identify a plurality of resource elements (REs) available for transmitting reference signals in at least one resource block (RB) of a subframe, a first set of REs from the plurality of REs being assigned to transmit reference signals and a second set of REs from the plurality of REs being assigned to transmit data, the first set of REs being different from the second set of REs; and
assign REs from the second set of REs to a wireless device in groups of a predetermined number of REs such that all assigned data REs within a group are within a same orthogonal frequency-division multiplexing (OFDM) symbol of a plurality of OFDM symbols of the at least one resource block and each data RE of the group being less than three resource elements away from another data RE of the group, each group of the predetermined number of REs corresponding to a data transmission from a group of antenna ports associated with a transmit diversity scheme.

25. A wireless communication method, comprising:
identifying a plurality of resource elements (REs) available for transmitting reference signals in at least one resource block (RB) of a subframe, a first set of REs from the plurality of REs being assigned to transmit reference signals and a second set of REs from the plurality of REs being assigned to transmit data, the first set of REs being different from the second set of REs; and
assigning the second set of REs to at least one space frequency block coding (SFBC) group such that all data REs within each SFBC group are in a same orthogonal frequency-division multiplexing (OFDM) symbol of a plurality of OFDM symbols of the at least one resource block and each data RE of the group being less than three resource elements away from another data RE of the group.

26. The method of claim 25, wherein the second set of REs comprise data REs not assigned to a channel state information reference signal (CSI-RS) RE or a muted CSI-RS RE.

27. A wireless communication apparatus, comprising:
means for identifying a plurality of resource elements (REs) available for transmitting reference signals in at least one resource block (RB) of a subframe, a first set of REs from the plurality of REs being assigned to transmit reference signals and a second set of REs from the plurality of REs being assigned to transmit data, the first set of REs being different from the second set of REs; and
means for assigning the second set of REs to at least one space frequency block coding (SFBC) group such that all data REs within each SFBC group are in a same orthogonal frequency-division multiplexing (OFDM) symbol of a plurality of OFDM symbols of the at least one resource block and each data RE of the group being less than three resource elements away from another data RE of the group.

28. The apparatus of claim 27, wherein the plurality of available data REs comprise data REs not assigned to one of a channel state information reference signal (CSI-RS) RE and a muted CSI-RS RE.

29. A non-transitory computer-readable medium having instructions stored thereon, said instructions comprising code for:
identifying a plurality of resource elements (REs) available for transmitting reference signals in at least one resource block (RB) of a subframe, a first set of REs from the plurality of REs being assigned to transmit reference signals and a second set of REs from the plurality of REs being assigned to transmit data, the first set of REs being different from the second set of REs; and
assigning the second set of REs to at least one space frequency block coding (SFBC) group such that all data REs within each SFBC group are in a same orthogonal frequency-division multiplexing (OFDM) symbol of a plurality of OFDM symbols of the at least one resource block and each data RE of the group being less than three resource elements away from another data RE of the group.

30. A wireless communication processor, configured to:
identify a plurality of resource elements (REs) available for transmitting reference signals in at least one resource block (RB) of a subframe, a first set of REs from the plurality of REs being assigned to transmit reference signals and a second set of REs from the plurality of REs being assigned to transmit data, the first set of REs being different from the second set of REs; and
assign the second set of REs to at least one space frequency block coding (SFBC) group such that all data REs within each SFBC group are in a same orthogonal frequency-division multiplexing (OFDM) symbol of a plurality of OFDM symbols of the at least one resource block and each data RE of the group being less than three resource elements away from another data RE of the group.

31. The processor of claim 30, wherein the plurality of available data REs comprise data REs not assigned to one of a channel state information reference signal (CSI-RS) RE and a muted CSI-RS RE.

32. A method of wireless communication, comprising:
receiving a reference signal from REs of at least one resource block of a subframe, the REs being assigned to transmissions of the reference signal from a plurality of REs available to transmit reference signals, and a set of REs from the plurality of REs that are not assigned to transmit reference signals being assigned to transmit data; and receiving data from the set of REs assigned to transmit data, the data being transmitted in groups of a predetermined number of REs such that all assigned data REs within a group are within a same orthogonal frequency-division multiplexing (OFDM) symbol of a plurality of OFDM symbols and each data RE of the group being less than three resource elements away from another data RE of the group, each group of the predetermined number of REs corresponding to data transmission from a group of antenna ports associated with a transmit diversity scheme.

33. The method of claim 32, wherein the reference signal comprises a channel state information reference signal (CSI-RS).

34. The method of claim 32, wherein the groups of the predetermined number of REs comprise space-frequency block code (SFBC) or space-time block code pairs.

35. The method of claim 32, wherein the transmit diversity comprises an Alamouti scheme.

36. A wireless communication apparatus, comprising:

means for receiving a reference signal from REs of at least one resource block of a subframe, the REs being assigned to transmissions of the reference signal from a plurality of REs available to transmit reference signals, and a set of REs from the plurality of REs that are not assigned to transmit reference signals being assigned to transmit data; and means for receiving data from the set of REs assigned to transmit data, the data being transmitted in groups of a predetermined number of REs such that all assigned data REs within a group are within a same orthogonal frequency-division multiplexing (OFDM) symbol of a plurality of OFDM symbols and each data RE of the group being less than three resource elements away from another data RE of the group, each group of the predetermined number of REs corresponding to data transmission from a group of antenna ports associated with a transmit diversity scheme.

37. The apparatus of claim 36, wherein the reference signal comprises a channel state information reference signal (CSI-RS).

38. The apparatus of claim 36, wherein the groups of the predetermined number of REs comprise space-frequency block code (SFBC) or space-time block code pairs.

39. The apparatus of claim 36, wherein the transmit diversity comprises an Alamouti scheme.

40. A wireless communication method, comprising:

receiving a reference signal from resource elements (REs) of at least one resource block of a subframe, the REs being assigned to transmissions of the reference signal from a plurality of REs available to transmit reference signals, and a set of REs from the plurality of REs that are not assigned to transmit reference signals being assigned to transmit data; and receiving data from the set of REs assigned to transmit data, the data being transmitted in a space frequency block coding (SFBC) groups of a predetermined number of REs such that all data REs within a SFBC group are in a same orthogonal frequency-division multiplexing (OFDM) symbol of a plurality of OFDM symbols and each data RE of the SFBC group being less than three resource elements away from another data RE of the SFBC group.

41. The method of claim 40, wherein the reference signal comprises a channel state information reference signal (CSI-RS).

42. A wireless communication apparatus, comprising:

means for receiving a reference signal from resource elements (REs) of at least one resource block of a subframe, the REs being assigned to transmissions of the reference signal from a plurality of REs available to transmit reference signals, and a set of REs from the plurality of REs that are not assigned to transmit reference signals being assigned to transmit data; and means for receiving data from the set of REs assigned to transmit data, the data being transmitted in a space frequency block coding (SFBC) groups of a predetermined number of REs such that all data REs within a SFBC group are in a same orthogonal frequency-division multiplexing (OFDM) symbol of a plurality of OFDM symbols and each data RE of the SFBC group being less than three resource elements away from another data RE of the SFBC group.

* * * * *